United States Patent
Fukuda

(10) Patent No.: US 8,023,093 B2
(45) Date of Patent: Sep. 20, 2011

(54) DISPLAY PANEL, MULTI-LAYER DISPLAY ELEMENT, AND METHOD OF FABRICATING THE SAME

(75) Inventor: Makoto Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/558,951

(22) Filed: Sep. 14, 2009

(65) Prior Publication Data

US 2010/0002183 A1    Jan. 7, 2010

Related U.S. Application Data

(63) Continuation of application No. PCT/JP2007/055244, filed on Mar. 15, 2007.

(51) Int. Cl.
*G02F 1/1347* (2006.01)
(52) U.S. Cl. .......................... 349/158; 349/74
(58) Field of Classification Search .................. None
See application file for complete search history.

(56) References Cited

U.S. PATENT DOCUMENTS 7,342,635 B2 * 3/2008 Choi ............................ 349/156

FOREIGN PATENT DOCUMENTS

| JP | 63-243915 A | 10/1988 |
|---|---|---|
| JP | 6-167719 A | 6/1994 |
| JP | 2548560 B2 | 10/1996 |
| JP | 9-230800 A | 9/1997 |
| JP | 10-239700 A | 9/1998 |
| JP | 2001-42353 A | 2/2001 |
| JP | 2001-343916 A | 12/2001 |
| JP | 2002-221699 A | 8/2002 |
| JP | 2003-15555 A | 1/2003 |
| JP | 2003-255391 A | 9/2003 |
| JP | 2003-295148 A | 10/2003 |
| JP | 2006-115037 A | 4/2006 |
| WO | 03/003109 A1 | 1/2003 |

OTHER PUBLICATIONS

International Search Report of PCT/JP2007/055244, date of Apr. 17, 2007.

* cited by examiner

*Primary Examiner* — Richard Kim
(74) *Attorney, Agent, or Firm* — Westerman, Hattori, Daniels & Adrian, LLP

(57) ABSTRACT

The present invention is to provide a display panel, a multi-layer display element, and a method of fabricating same, which can readily align alignment positions of individual display panels with each other even though common alignment marks are provided on each of display panels. A display panel includes a pair of substrates faced to each other as a display material layer is sandwiched between the substrates, a plurality of pixels provided in a plane almost in parallel with a substrate surface between the substrates, and a plurality of alignment marks formed in different shapes and linearly arranged on at least one of the pair of substrates at a predetermined interval for alignment in placing the display panels in layers.

18 Claims, 15 Drawing Sheets

DISPLAY PANEL, MULTI-LAYER DISPLAY ELEMENT, AND METHOD OF FABRICATING THE SAME

This Application is a continuation of International Application No. PCT/JP2007/055244, filed Mar. 15, 2007.

BACKGROUND OF THE INVENTION

1. Field of the Invention

The present invention relates to a multi-layer display element having a plurality of display panels placed in layers, and a method of fabricating the same.

2. Description of the Related Art

In the future, it is expected that electronic paper rapidly spreads, which can hold display images with no power supply and electrically rewrite a display content. Electronic paper is under development with the aim of realizing ultralow power consumption enabling memory display even though a power supply is turned off, reflective display easy on the eyes with no fatigue, and a flexible, low-profile display body with flexibility like paper. As the applications of electronic paper, electronic books, electronic newspapers, and electronic poster are proposed.

Depending on the differences of display types, electronic paper is categorized into an electrophoretic type, a twisting ball type, an electrochemical type, and a liquid crystal type. The electrophoretic type is a type in which charged particles are migrated in the air or in a liquid. The twisting ball type is a type in which charged particles tinted into two colors are rotated. The electrochemical type is a type using a display element having a structure in which a display material is sandwiched between electrodes, the display material being colored, faded or changed in color by an electrochemical reaction when an electric field is applied. A liquid crystal display element is a non-self-luminous display element having a structure in which a liquid crystal layer is sandwiched between a pixel electrode and a counter electrode.

The liquid crystal type is predominantly advantageous in color representation for electronic paper, which uses a liquid crystal display element (a liquid crystal display). In the liquid crystal type, a cholesteric liquid crystal type is advantageous, which uses a liquid crystal composition forming a cholesteric phase. This liquid crystal composition is referred to as cholesteric liquid crystals or chiral nematic liquid crystals. Hereinafter, it is referred to as "cholesteric liquid crystals". In the cholesteric liquid crystal type, the voltage to be applied to liquid crystals is controlled to switch the states of liquid crystals between the interference reflection state (planar state) in which light at a predetermined wavelength is selectively reflected in a liquid crystal layer according to the helical pitch of liquid crystal molecules and the transmissive state (focal conic state) in which the liquid crystal layer loses the selectivity of the reflection wavelength to transmit most of the incident light. Because these two states are stably held for a long time after the voltage is removed, the cholesteric liquid crystal type can maintain images with no power supply. In addition, as to the colorization of displayed images, in the cholesteric liquid crystal type, liquid crystal display panels in three colors can be used as the panels are laid on one another. Thus, in the cholesteric liquid crystal type, a black light absorbing layer is provided on the rear side, whereby when all the liquid crystal display panels are turned into the transmissive state, the screen can be displayed black, whereas when a liquid crystal display panel in necessary color is turned into the interference reflection state, the screen can be displayed in color.

In addition, also in the electrochemical type, because the states can be switched between the transparent state of transmitting the incident light and the reflective or absorbing state, display panels are laid on one another for use as similar to the cholesteric liquid crystal type, whereby color representation is allowed.

On the other hand, except the liquid crystal type and the electrochemical type, the other types do not allow the light transmissive state. Therefore, when color representation is conducted in the other types, it is necessary that a color filter is arranged on the display surface, the color filter being applied with three colors, red (R), green (G) and blue (B), for example, in blocks, and each pixel is divided into three sub-pixels. On this account, in these other types, the lightness is one-third as compared with that of the cholesteric liquid crystal type. Therefore, among reflective display elements with no provision of a backlight unit or front light unit, multi-layer display elements using the cholesteric liquid crystal type or the electrochemical type in particular can obtain bright display, and these elements are predominantly advantageous in regard to color representation.

In the multi-layer display element having a plurality of display panels placed in layers, in placing display panels in individual colors in layers, it is necessary to align the positions of the individual display panels in the in-plane direction and bond the panels together so as not to misalign the alignment positions of the pixels of the display panels. When the positions of the display panels in the in-plane direction are displaced, the alignment positions of the pixels are misaligned to cause color shift or the degradation of brightness, which leads to a reduced sharpness of the edges of text and images. On this account, it is difficult to obtain excellent display quality.

In order to align (match) the alignment positions of display panels with each other, generally, alignment marks are formed on each of display panels, and an operator enhances and visually recognizes the marks with a microscope, for example. At this time, the positions of the display panels are aligned with each other such that the positions of the alignment marks have a predetermined relation between the display panels. However, when alignment marks in the same shape are formed on each of the display panels, it is difficult to distinguish between a plurality of the alignment marks laid on each other which alignment mark corresponds to which one of upper and lower display panels. On this account, the operator slightly moves any one of the display panels and determines that the moved alignment mark corresponds to the display panel moved by the operator. Therefore, extra work is required to suffer working efficiency. Moreover, also in the case in which alignment marks are imaged by a CCD (Charge-Coupled Device) camera to subject the taken image to image processing for detecting the positions of the alignment marks, it is difficult to distinguish between the alignment marks laid on each other, and it is not easy to match alignment positions with each other.

In order to solve the problem that it is difficult to distinguish between alignment marks laid on each other, it is possible to efficiently match alignment positions with each other when alignment marks are formed in different shapes for each of display panels.

In addition, in the multi-layer display element, because each of the display panels has a structure in which electrode substrates are paired and attached to each other, each display panel has some thickness. On this account, when the thickness of two display panels placed in layers is increased, it is difficult to visually recognize alignment marks at the same time, which leads to a degraded position accuracy of alignment positions, or to longer work hours required for alignment work.

Patent Document 1 (JP-A-2003-295148) discloses a method of improving the visibility of alignment marks in order to solve the problem that it is difficult to visually recognize the alignment marks of two display panels placed in layers at the same time. FIG. 17 is a plan view schematically depicting a liquid crystal display element 400 as disclosed in Patent Document 1. As shown in FIG. 17, in the liquid crystal display element 400, a dummy terminal forming area 418 is provided on each of transparent substrates 401 of a plurality of liquid crystal display panels 413, the dummy terminal forming area 418 is formed at the position corresponding to a terminal forming area of the adjacent liquid crystal display panel 413, and an alignment mark 419 is formed in the terminal forming area and the dummy terminal forming area 418 for use in placing the panels in layers.

In addition, not shown in the drawing, Patent Document 2 (JP-A-2001-343916) discloses a method of forming alignment marks in concentric circular shapes. In both of the methods, because the alignment marks are formed of a transparent electrode material, the contrast becomes low to cause insufficient visibility.

In order to solve the problem of insufficient visibility, Patent Document 3 (Japanese Patent No. 2548560) discloses a method in which alignment electrodes 518 and 519 are also formed outside a display area E of display panels 513, voltage is applied to the electrodes 518 and 519 formed outside the display area E to produce or erase color for providing contrast to the areas surrounding the electrodes when the display panels 513 are placed in layers, and thus alignment marks are provided. FIG. 18 is a plan view schematically depicting a previous liquid crystal display element 500 disclosed in Patent Document 3. As shown in FIG. 18, in the liquid crystal display element 500, one or more of terminals of the alignment electrodes 518 are formed as adjacent to a terminal group of display electrodes, the terminals of the alignment electrodes 518 having a width narrower than that of the terminal group of the display electrodes, and the alignment electrodes 518 are extended into a seal to indicate alignment marks with the display electrodes 519 faced outside an original display area E.

The method of forming the alignment electrodes outside the display area of the display panel for providing alignment marks is superior in visibility as compared with the case of forming alignment marks with a material for forming a transparent electrode. However, because it is necessary to apply voltage to the electrodes, a circuit for voltage application has to be wired to the terminals of the electrodes, which decreases working efficiency in preparing the display panel.

In addition, in the method of forming the alignment marks in the area of a single electrode substrate where the electrode substrates of the display panel are not laid on each other beside the terminal forming area, and in the method of forming the shapes of the alignment marks in concentric circular shapes, the shapes of the alignment marks are different for individual display panels. On this account, a necessity occurs to change processes of forming alignment marks in preparing the individual display panels. Particularly, in a multi-layer liquid crystal display element in which a plurality of liquid crystal display panels for displaying different colors is placed in layers, the difference of the liquid crystal panels is only liquid crystals to be sealed between substrates, and the liquid crystal panels are allowed to have the same configuration and layout of the other members, such as electrode substrates, sealing wall materials, and end sealing materials. Thus, suppose that a process of forming alignment marks can be made common to all the display panels, fabrication efficiency will be improved dramatically.

SUMMARY OF THE INVENTION

It is an object of the invention is to provide a display panel, a multi-layer display element, and a method of fabricating the same, which can readily align the alignment positions of individual display panels with each other even though common alignment marks are provided on each of the display panels.

The above-described objects are achieved by a display panel comprising a pair of substrates faced to each other as a display material layer is sandwiched therebetween, a plurality of pixels provided in a plane parallel with a substrate surface between the substrates, and a plurality of alignment marks formed in different shapes and linearly arranged on at least one of the pair of the substrates at a predetermined interval for alignment in placing the display panels in layers.

The above invention is characterized in that the plurality of the alignment marks are arranged in parallel with a direction of extending an electrode to drive the plurality of the pixels.

The above invention is characterized in that the predetermined interval is equal to a distance of an integral multiple of a pixel pitch.

The above invention is characterized in that the alignment marks are formed to contact with two facing surfaces of the pair of the substrates.

The above invention is characterized in that it comprises a spacer configured to contact with the two facing surfaces for holding an interval between the pair of the substrates, wherein the alignment marks are formed of the same material as a material of forming the spacer in the same layer.

The above invention is characterized in that the plurality of the pixels are provided in a dot matrix.

The above invention is characterized in that the display material layer has liquid crystals forming a cholesteric phase.

The above-described objects are achieved by a multi-layer display element comprising a plurality of display panels placed in layers, wherein the display panel is the display panel according to the above invention.

The above invention is characterized in that the display panel has a pixel area formed of the plurality of the pixels, and pixel areas of the display panels adjacently placed in layers are displaced in a direction of arranging the alignment marks.

The above-described objects are achieved by a method of fabricating a multi-layer display element, the method comprising the steps of preparing a plurality of display panels, each including a pair of substrates faced to each other as a display material layer is sandwiched therebetween, a plurality of pixels provided along a display surface of the substrates, and a plurality of alignment marks formed in different shapes and linearly arranged on at least one of the pair of the substrates at a predetermined interval for alignment in placing the display panels in layers, laying the plurality of the display panels on each other, aligning the alignment marks in different shapes formed in the adjacent display panels with each other, and bonding the plurality of the display panels together.

The above invention is characterized in that the plurality of the alignment marks are formed so as to be arranged in parallel with a direction of extending an electrode to drive the plurality of the pixels.

The above invention is characterized in that the predetermined interval is equal to a distance of an integral multiple of a pixel pitch.

The above invention is characterized in that the alignment marks are formed to contact with two facing surfaces of the pair of the substrates.

The above invention is characterized in that the alignment marks are formed of the same material as a material of forming a spacer at the same time in the same layer, the spacer configured to contact with the two facing surfaces for holding an interval between the pair of the substrates.

The above invention is characterized in that the plurality of the pixels are provided in a dot matrix.

The above invention is characterized in that liquid crystals for forming a cholesteric phase are used for the display material layer.

The above invention is characterized in that the display panels are placed in layers such that pixel areas formed of the plurality of the pixels are displaced in a direction of arranging the alignment marks.

The above invention is characterized in that the alignment marks formed in each of the display panels are visually recognized in the same visual field, and the display panel is moved to align the alignment marks with each other.

According to the invention, such a display panel and a multi-layer display element can be implemented, which can readily align the alignment positions of the individual display panels with each other even though common alignment marks are provided on each of the display panels.

DESCRIPTION OF THE PREFERRED EMBODIMENTS

First Embodiment

A display panel, a multi-layer display element, and a method of fabricating the same according to a first embodiment of the invention will be described with reference to FIGS. 1 to 9.

Figure 1:
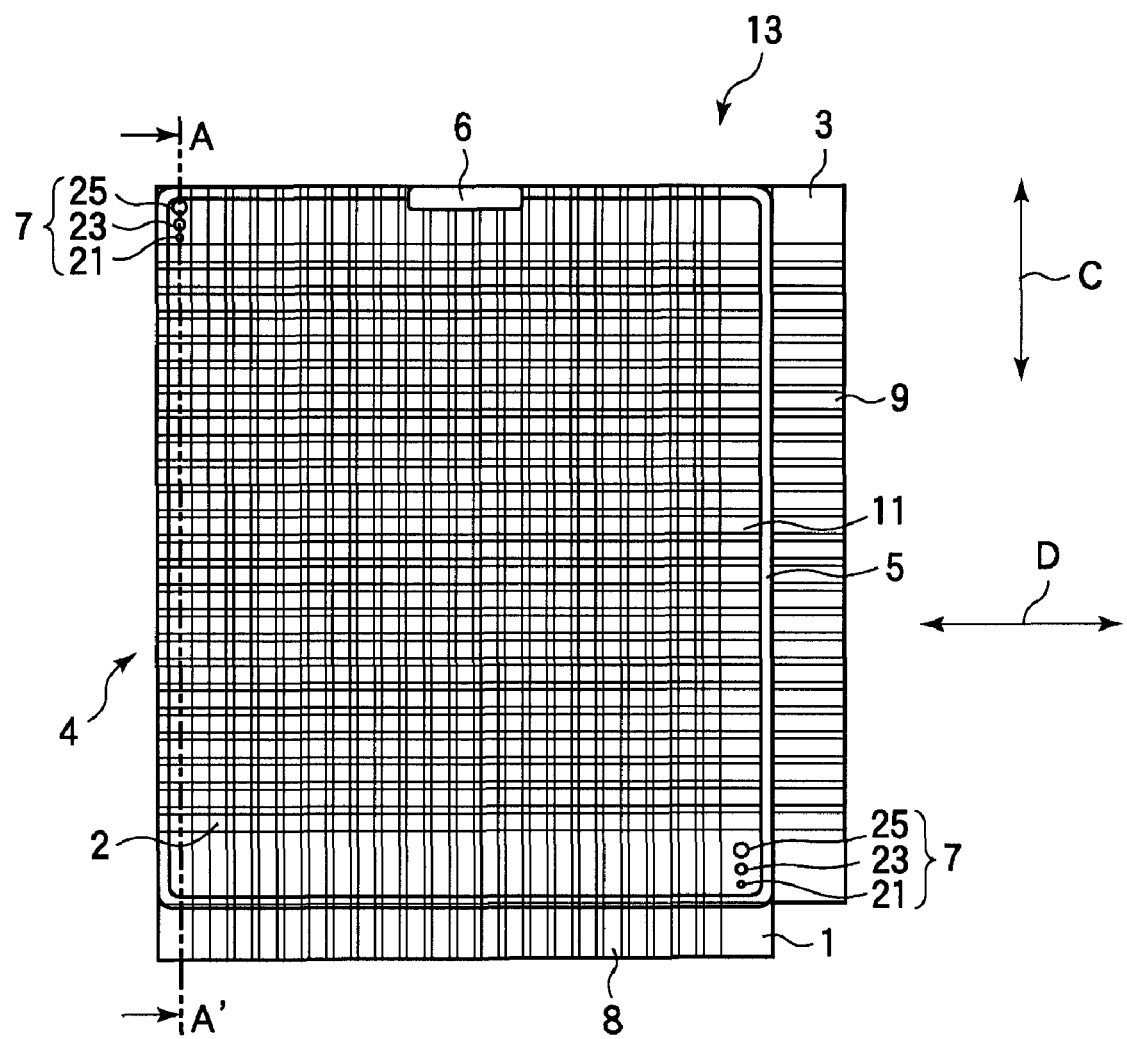
FIG. 1 is a plan view depicting a display panel according to a first embodiment of the invention when seen from the display surface side.
Figure 2:
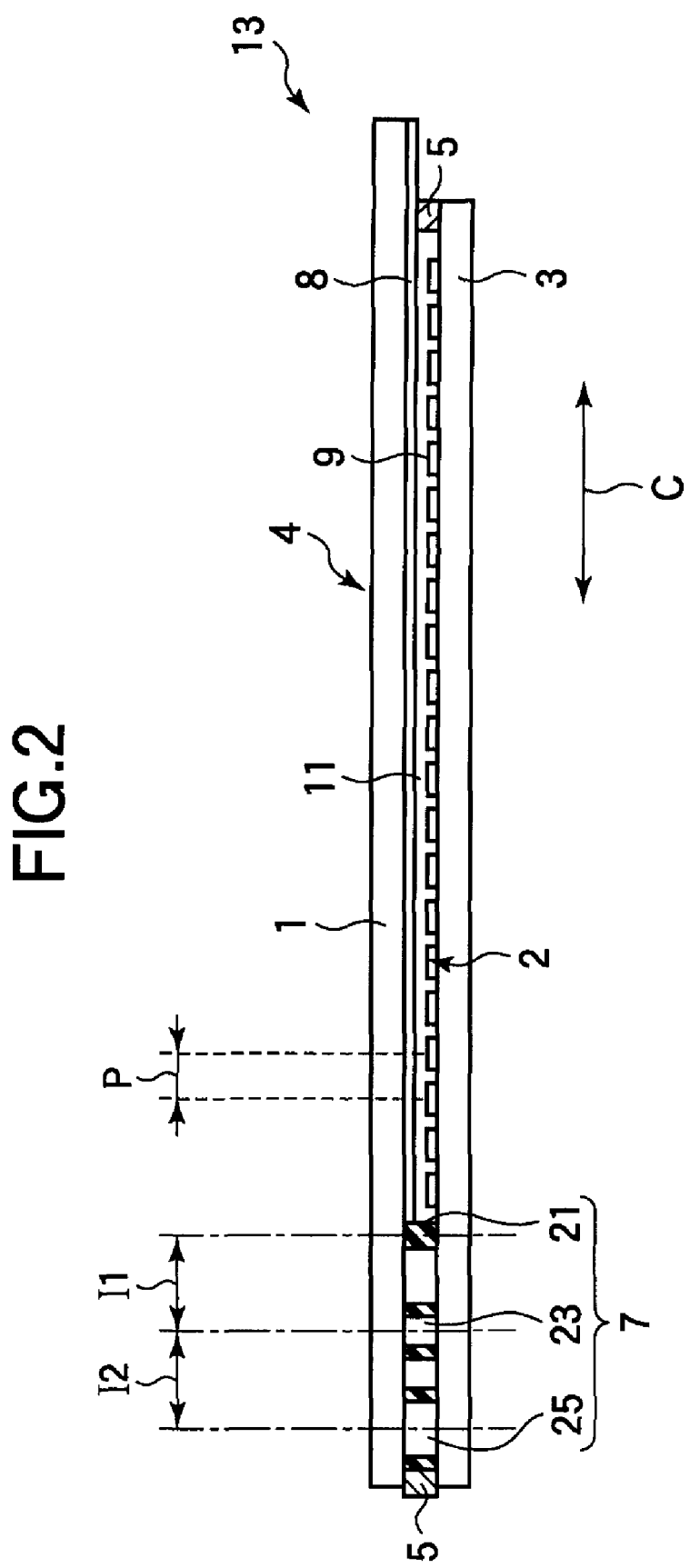
FIG. 2 is a cross section depicting the cross-sectional configuration of the display panel according to the first embodiment of the invention cut at line A-A shown in FIG. 1.

FIG. 1 is a plan view depicting a display panel of this embodiment when seen from the display surface side. FIG. 2 is a cross section depicting the cross-sectional configuration cut at line A-A shown in FIG. 1.

A display panel 13 of the embodiment is used mainly as placed in layers. For example, three display panels 13, which can display blue, green and red, are placed in layers, whereby color representation is allowed.

As shown in FIG. 1, the display panel 13 is formed in a rectangular plate shape, and a pixel area 4, which can display images, is provided in the center. The display panel 13 has a pair of rectangular glass substrates 1 and 3, a sealing wall 5, a display material layer 11, and an alignment mark group 7.

As shown in FIG. 2, the paired glass substrates 1 and 3 are faced to each other as the display material layer 11 is sandwiched between the substrates 1 and 3. For the glass substrates 1 and 3, a piece of glass is used, which is cut into a plate of 10 (cm)×8 (cm) in length and width, for example. However, instead of glass, a film substrate (resin substrate) with sufficient flexibility may be used, which is made of a resin such as polycarbonate (PC), polyethylene terephthalate (PET), polyethylene naphtahalate (PEN), polyether sulfone (PES), or cycloolefin polymer (COP). In the embodiment, although both of the glass substrates 1 and 3 have light-transmissive characteristics, when a plurality of the display panels 13 is placed in layers, the glass substrate 3 of the display panel 13 arranged in the undermost layer when seen from the display surface side is not necessarily light transmissive.

Between the pair of the glass substrates 1 and 3, along the outer region of the area where the glass substrate 1 is laid on the glass substrate 3, the sealing wall 5 is provided to hermetically seal the overlaid area, and a sealing port 6 is provided to fill liquid crystals (see FIG. 1). Thus, the liquid crystals for forming the cholesteric phase are sealed between the glass substrate 1 and the glass substrate 3, and then the display material layer 11 is formed.

In addition, in the pair of the glass substrates 1 and 3, on the substrate surface of the glass substrate 1 arranged on the display surface side, a plurality of transparent electrode lines 8 is provided on the glass substrate 3 side, which is extended in parallel with the directions of arrow C.

On the other hand, on the substrate surface of the glass substrate 3 arranged on the opposite side of the display surface, a plurality of transparent electrode lines 9 is provided on the glass substrate 1 side, which is extended in parallel with the directions of arrows D (see FIG. 1). In addition, in the embodiment, the directions of arrow C are nearly orthogonal to the directions of arrows D. However, an angle at which the transparent electrode line 8 intersects the transparent electrode line 9 may be angles other than an angle of 90 degrees.

Around each of intersecting parts of the transparent electrode lines 8 with the transparent electrode lines 9, a plurality of pixels 2 is formed. The plurality of the pixels 2 is provided in a dot matrix in the plane parallel with the substrate surface of the glass substrate 1, for example. Each of the pixels 2 is driven by the transparent electrode lines 8 and 9 to drive the display material layer 11, the transparent electrode lines 8 and 9 energized under control of a driver IC (Integrated Circuit), not shown, and the pixels 2 are provided in the pixel area 4 to display various images.

In addition, between the pair of the glass substrates 1 and 3, the alignment mark group 7 is provided to align the display panel 13 of the embodiment with the other display panels to be placed in layers when the display panel 13 is laid on the other display panels in layers. The alignment mark group 7 is formed to contact with two facing surfaces of the pair of the glass substrates 1 and 3 inside the sealing wall 5, and formed to have the same height as the distance between these two facing surfaces. The alignment mark group 7 is the members having adhesive properties, for example, and bonded to both of the substrates 1 and 3. In addition, although the alignment mark group 7 in the embodiment is formed to contact with two facing surfaces of the pair of the glass substrates 1 and 3, the alignment mark group 7 may be formed to contact with only any one of the glass substrates 1 and 3.

For example, the alignment mark group 7 can be formed by photolithography. More specifically, a photoresist of acrylic photosensitive resin is coated over one of the glass substrates 1 and 3. Subsequently, the photoresist is baked as necessary, and then the alignment mark group 7 is formed by a photolithographic process of exposing the photoresist with a mask and cleaning the photoresist. For a material for forming the alignment mark group 7, a positive or negative photo-curable resin (photoresist) or a thermosetting resin can be preferably used.

As shown in FIG. 1, the alignment mark group 7 has three alignment marks, a small alignment mark 21, a medium alignment mark 23, and a large alignment mark 25 in different shapes.

The small alignment mark 21 is formed in a solid cylindrical shape extended between the glass substrates 1 and 3 in the direction vertical to the surfaces of the glass substrates 1 and 3. The small alignment mark 21 is formed in a solid circular shape when seen from the direction vertical to the display surface.

The medium alignment mark 23 has the inner diameter greater than the diameter of the small alignment mark 21, and is formed in a hollow cylindrical shape extended between the glass substrates 1 and 3 in the direction vertical to the surfaces of the glass substrates 1 and 3. The medium alignment mark 23 is formed in a ring shape having the inner diameter greater than the diameter of the small alignment mark 21 when seen from the direction vertical to the display surface.

The large alignment mark 25 has the inner diameter greater than the outer diameter of the medium alignment mark 23, and is formed in a hollow cylindrical shape extended between the glass substrates 1 and 3 in the direction vertical to the surfaces of the glass substrates 1 and 3. The large alignment mark 25 is formed in a hollow circular shape having the inner diameter greater than the outer diameter of the medium alignment mark 23 when seen from the direction vertical to the display surface.

The alignment marks 21, 23, and 25 are formed such that the medium alignment mark 23 encircles the outer region of the small alignment mark 21, and the large alignment mark 25 encircles the outer region of the medium alignment mark 23 when they are concentrically laid on one another as seen from the direction vertical to the display surface.

In addition, the sectional shape of the small alignment mark 21, the medium alignment mark 23 and the large alignment mark 25 may be a given shape, such as a circular shape, an annular shape (ring), square, L-shape, cross, or key shape.

The alignment mark group 7 is provided near two corners on the diagonal line of the display panel 13 (upper left and lower right corners in the drawing). Each of the alignment mark groups 7 is provided in the order of the large alignment mark 25, the medium alignment mark 23, and the small alignment mark 21 from above along the directions of arrow C. In other words, the large alignment mark 25, the medium alignment mark 23, and the small alignment mark 21 are linearly arranged along the directions of arrow C nearly in parallel with the direction of extending the transparent electrode lines 8 provided on the glass substrate 1.

In addition, as shown in FIG. 2, an interval I1 between the center of the small alignment mark 21 and the center of the medium alignment mark 23 and an interval I2 between the center of the medium alignment mark 23 and the center of the large alignment mark 25 are formed in equal distances (I1=I2) in the plane along the surfaces of the glass substrates 1 and 3. Here, the point for determining the position of the alignment mark in finding the interval I1 may be set freely, such as the center of gravity of the alignment mark, or the corner of an L-shaped alignment mark when the L-shaped one is used. The interval I1 and the interval I2 are provided in a distance equal to a distance almost twice a pixel pitch P for the transparent electrode lines 9 provided in the directions of arrow C (I1=I2=2P). In addition, the pixel pitch P in the embodiment is the interval between the center lines of the transparent electrode lines 9 adjacent to each other in the direction of extending the transparent electrode lines 9 and in the directions of arrow C in which the large alignment mark 25, the medium alignment mark 23, and the small alignment mark 21 are arranged. Here, in the embodiment, the interval I1 and the interval I2 are the distance twice the pixel pitch P in the directions of arrow C. However, other distances may be set as long as these distances are almost equal to the distances of positive integral multiples of the pixel pitch P.

Figure 3:
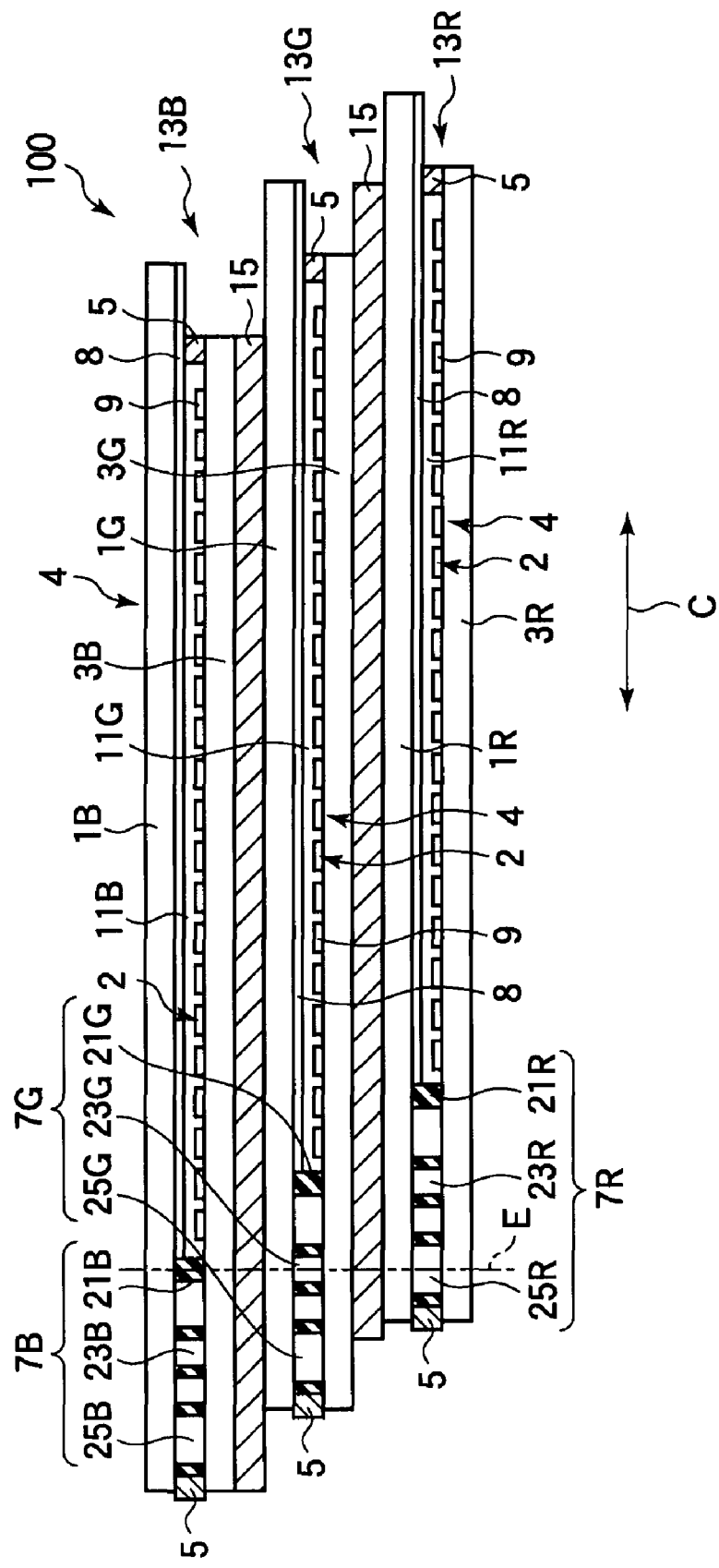
FIG. 3 is a cross section depicting a multi-layer display element according to the first embodiment of the invention.

FIG. 3 is a cross section depicting the multi-layer display element.

The display panels 13 are provided so as to be placed in layers. As shown in FIG. 3, three of the display panels 13 are placed in layers to form a multi-layer display element 100.

These three display panels 13 provided in the multi-layer display element 100 are a display panel 13B for blue, a display panel 13G for green, and a display panel 13R for red, and these panels are placed in layers in this order from the display surface side (in order from top to bottom in the drawing). Thus, the multi-layer display element 100 allows full-color representation. Particularly in the reflective display panel which reflects light to display images such as display panels using cholesteric liquid crystals, when these display panels are laid on one another to construct a multi-layer structure, because each of the layers can use the reflected light of the light incident into the entire pixel area for display, bright display can be obtained.

The individual display panels 13 are bonded to each other with an adhesive layer 15 provided between the display panels 13.

The display panel 13B and the display panel 13G are placed in layers such that the center of a medium alignment mark 23G formed in the display panel 13G is aligned with the center of a small alignment mark 21B formed in the display panel 13B.

In addition, the display panel 13G and the display panel 13R are placed in layers such that the center of a large alignment mark 25R formed in the display panel 13R is aligned with the center of the medium alignment mark 23G formed in the display panel 13G.

Thus, as depicted by dashed double-dotted line E, the centers of the small alignment mark 21B of the display panel 13B, the medium alignment mark 23G of the display panel 13G, and the large alignment mark 25R of the display panel 13R are aligned with one another on a straight line vertical to the glass substrates 1 and 3. On this account, the display panel 13B and the display panel 13G (or the display panel 13G and the display panel 13R) adjacently placed in layers are displaced by the interval I1, that is, the distance of two pitches, which is the distance twice the pixel pitch P, in the directions of arrow C where the alignment mark group 7 is arranged.

The display panels 13B, 13G, and 13R are placed in layers as they are displaced by two pitches each in the directions of arrow C, whereby the pixel areas 4 of the display panels 13B, 13G, and 13R are displaced by two pitches each in the directions of arrow C. For example, the pixel area 4 of the display panel 13B is displaced from the pixel area 4 of the display panel 13G by two pitches in the directions of arrow C. Therefore, the pixels 2 of the pixel areas 4 of the display panels 13B, 13G, and 13R are correspondingly displaced by the distance of two pitches in the directions of arrow C. On this account, the display panel 13B is displaced from the display panel 13R by four pitches, and the width of the pixel area 4 in the directions of arrow C provided on each of the display panels 13B, 13G, and 13R is formed wider by four pitches than the width of the display area actually contributed to displaying images. In other words, the width of the pixel area formed on each of the display panels is wider than that of the display area by the amount that the number of display panels to be placed in layers on at least a single display panel is multiplied by the interval between alignment marks. In addition, in the embodiment, the area where the pixels 2 are arranged on each of the display panels 13B, 13G, and 13R is defined as the pixel area 4, and the area where the pixel areas 4 are laid in three layers when the three display panels 13B, 13G, and 13R are placed in layers is defined as the display area.

Each of the display panels 13B, 13G, and 13R is formed with the pixel area 4 having four more pitches than the number of pixel columns of the display area, that is, four extra pixel columns. On this account, suppose that the number of pixel columns for forming the display area is n, from one to n, each of the display panels 13B, 13G, and 13R has the pixel area 4 formed of n plus four pixel columns, four columns added to the number n of the pixel columns of the display area.

In addition, in the case of the multi-layer display element having a two layer structure in which two display panels are placed in layers at the interval between the alignment marks being the distance of one pitch, the pixel area is formed on each of the display panels by n plus one pixel columns, one pixel column greater than the number of pixel columns of the display area.

In laying the display panels 13B, 13G, and 13R on one another, two display panels 13B and 13G are laid on each other as the first pixel column from the end part of the pixel area 4 of the display panel 13G is aligned with the third pixel column from the end part of the pixel area 4 of the display panel 13B.

On the other hand, two display panels 13G and 13R are laid on each other as the first pixel column from the end part of the pixel area 4 of the display panel 13R is aligned with the third pixel column from the end part of the pixel area 4 of the display panel 13G.

In other words, these three display panels 13B, 13G, and 13R are laid on one another as they are displaced by two pitches each. The fifth to (n+4)th pixel columns provided on the display panel 13B, the third to (n+2)th pixel columns provided on the display panel 13G, and the first to nth pixel columns provided on the display panel 13R are laid on one another. On this account, the first and second pixel columns for two pitches formed on the display panel 13B and the (n+3)th and (n+4)th pixel columns for two pitches formed on the display panel 13R are provided so as not to be laid on the pixel columns formed on the display panel 13G.

In the multi-layer display element 100 of the embodiment, for a method of connecting each of the display panels 13B, 13G, and 13R to the driver IC or drive power supply circuit, a publicly known method can be used. This is a general method in which the transparent electrode lines 8 and 9 are exposed in the end part of the display panel 13 and the exposed transparent electrode lines 8 and 9 are connected to an FPC (Flexible Printed Circuit), not shown. However, in the invention, because the display panels 13B, 13G, and 13R in layers are prepared as they are displaced to one another, images displayed on the display panels 13B, 13G, and 13R are displaced in every layer, when the FPC is connected by a method similar to the one before. This problem will not arise when such an FPC is used that the FPC allows images to be matched in every layer and displayed on the display panels 13B, 13G, and 13R. However, it is necessary to use a plurality of FPCs having different patterns for individual layers, which is not preferable with regard to fabrication costs.

In addition, when the positions to fix FPCs are displaced as corresponding to the transparent electrode lines 8 and 9 of each of the display panels 13B, 13G, and 13R, display misalignment will not occur. However, in this case, it is necessary to change alignment marks for each of the display panels 13B, 13G, and 13R, the alignment marks for aligning the terminal parts of the transparent electrode lines 8 and 9 provided on each of the display panels 13B, 13G, and 13R with the FPCs. This is not preferable with regard to working efficiency.

In the multi-layer display element 100 of the embodiment, for the FPC connected to each of the display panels 13B, 13G, and 13R to be laid on one another, FPCs having the same pattern are used.

Three FPCs connected to the display panels 13B, 13G, and 13R are each provided with n plus four lines of wiring the same number as n plus four pixel columns provided on each of display panels 13B, 13G, and 13R. The FPC to be connected to each of the display panels 13B, 13G, and 13R is connected to the first to (n+4)th pixel columns provided on each of the display panels 13B, 13G, and 13R.

The driver IC sends signals such that each of the pixels 2 arranged in the direction of visually recognizing an image corresponds to the same portion of the image displayed on the display surface of the multi-layer display element 100. For example, the driver IC sends signals such that the signal sent to the fifth pixel column provided on the display panel 13B, the signal sent to the third pixel column provided on the display panel 13G, and the signal sent to the first pixel column provided on the display panel 13R correspond to one another. Thus, the driver IC sends signals to the fifth to (n+4)th pixel columns provided on the display panel 13B, the third to (n+2)th pixel columns provided on the display panel 13G, and the first to nth pixel columns provided on the display panel 13R. In other words, the first to fourth wirings provided on the display panel 13B, the first, second, (n+1)th, and (n+2)th wirings provided on the display panel 13G, and the (n+1)th to (n+4)th wirings provided on the display panel 13R are not used for signal transmission.

With these configurations described above, the FPCs having the same wiring pattern can be used in common for the display panels 13B, 13G, and 13R in individual layers. Thus, the position to fix the FPC to each of the display panels 13B, 13G, and 13R becomes the common position, and alignment marks, not shown, for positioning the FPCs to the display panels 13B, 13G, and 13R can be provided at the same position on each of the display panels 13B, 13G, and 13R. Therefore, the commonality of the display panels 13B, 13G, and 13R can be achieved.

Hereinafter, a fabrication method of the multi-layer display element 100 will be described.

In fabricating the multi-layer display element 100, first, three display panels 13B, 13G, and 13R are prepared.

In preparing the display panels 13B, 13G, and 13R, first, stripe patterns are formed on the glass substrates 1 and 3 by etching, whereby the transparent electrode lines 8 and 9 are formed.

After the electrode lines 8 and 9 are formed on the glass substrates 1 and 3, alignment mark groups 7B, 7G, and 7R are formed near two corners on the diagonal line of the glass substrates 1 and 3 by the photolithographic process of coating a resist, exposing the resist with a mask, and then cleaning the resist.

After the alignment mark groups 7B, 7G, and 7R are formed, a dispenser is used to draw the sealing wall 5 on the edge of the area where the glass substrates 1 and 3 are laid on each other.

Spacer beads (not shown) are sprinkled over one of the glass substrates 3 and 1, and the glass substrates 1 and 3 are bonded to each other to form a liquid crystal cell.

After three liquid crystal cells are formed, then B (blue display), G (green display), and R (red display) liquid crystals are filled into the liquid crystal cells under vacuum to seal the sealing ports 6 (see FIG. 1). Thus, display material layers 11B, 11G, and 11R are formed in the cells.

After the display material layers 11B, 11G, and 11R are formed, the FPCs are heated and pressed against the electrode terminal parts of the end parts of the glass substrates 1 and 3 through an ACF (Anisotropic Conductive Film) to form the display panels 13B, 13G, and 13R.

After the display panels 13B, 13G, and 13R are prepared, the display panels 13B, 13G, and 13R are placed in layers to fabricate the multi-layer display element 100.

Figure 4:
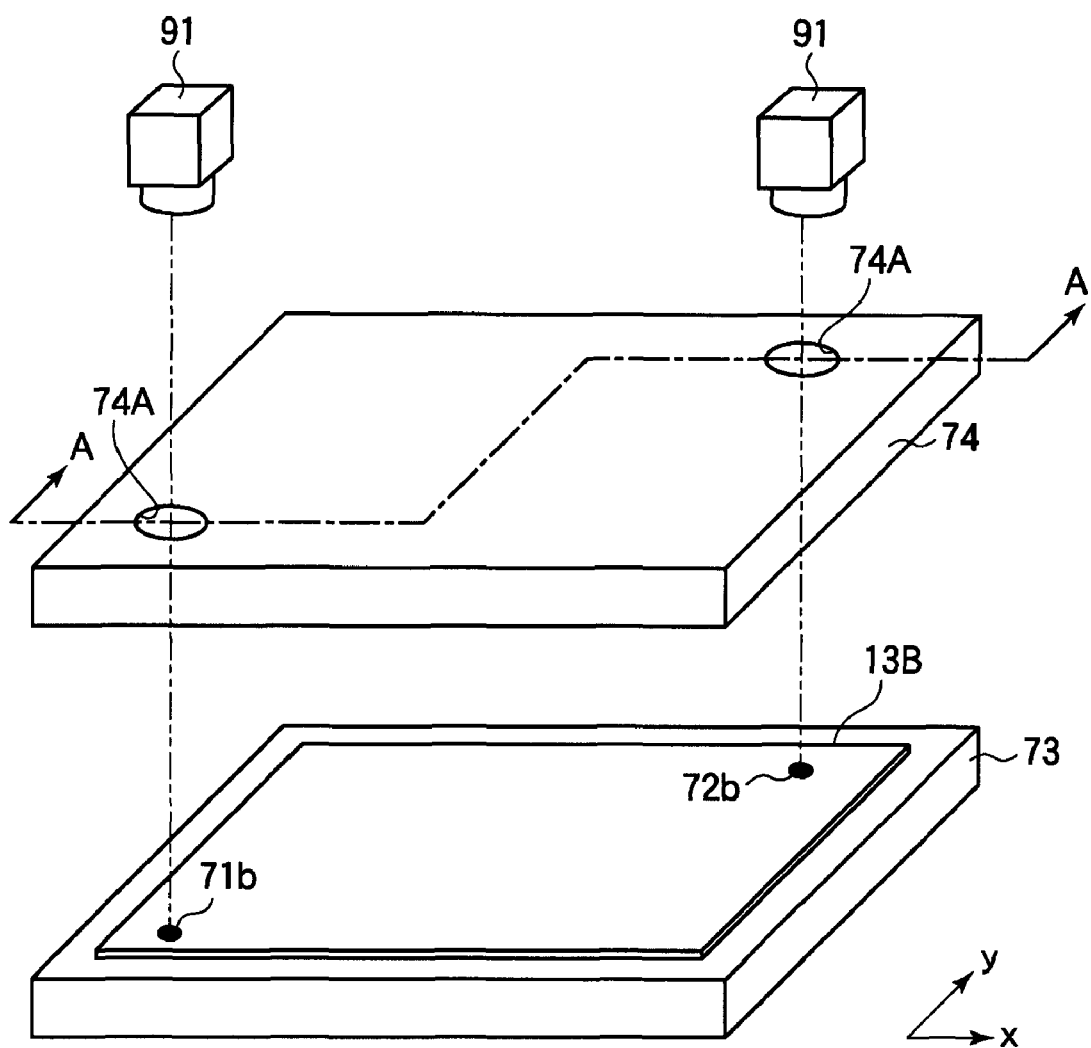
FIG. 4 is a perspective view schematically depicting a method of fabricating the multi-layer display element according to the first embodiment of the invention, showing adsorption plates and a display panel.

Next, an alignment process and a bonding process in placing the display panels 13B, 13G, and 13R in layers will be described with reference to FIGS. 4 to 7. FIG. 4 is a perspective view schematically depicting adsorption plates (support plates) 73 and 74 and the display panel 13B.

First, as shown in FIG. 4, the display panel 13B is adsorbed and fixed on the adsorption plate 73 as a glass substrate 1B (see FIG. 3) is faced to the adsorption plate 73 side. Subsequently, a transparent liquid photo-curable adhesive is coated over a glass substrate 3B of the display panel 13B (see FIG. 3). Subsequently, the display panel 13G (see FIG. 3) is adsorbed and fixed on the adsorption plate 74 as a glass substrate 1G (see FIG. 3) is faced to the adsorption plate 74 side. On the adsorption plate 74, an opening 74A is formed at the position laid on each of the alignment mark groups 7 and 7 provided two each on the display panels 13B and 13G. At least one of the adsorption plates 73 and 74 is placed on an X-Y stage, not shown, and is movable in the X-direction and the Y-direction in FIG. 4.

Figure 5:
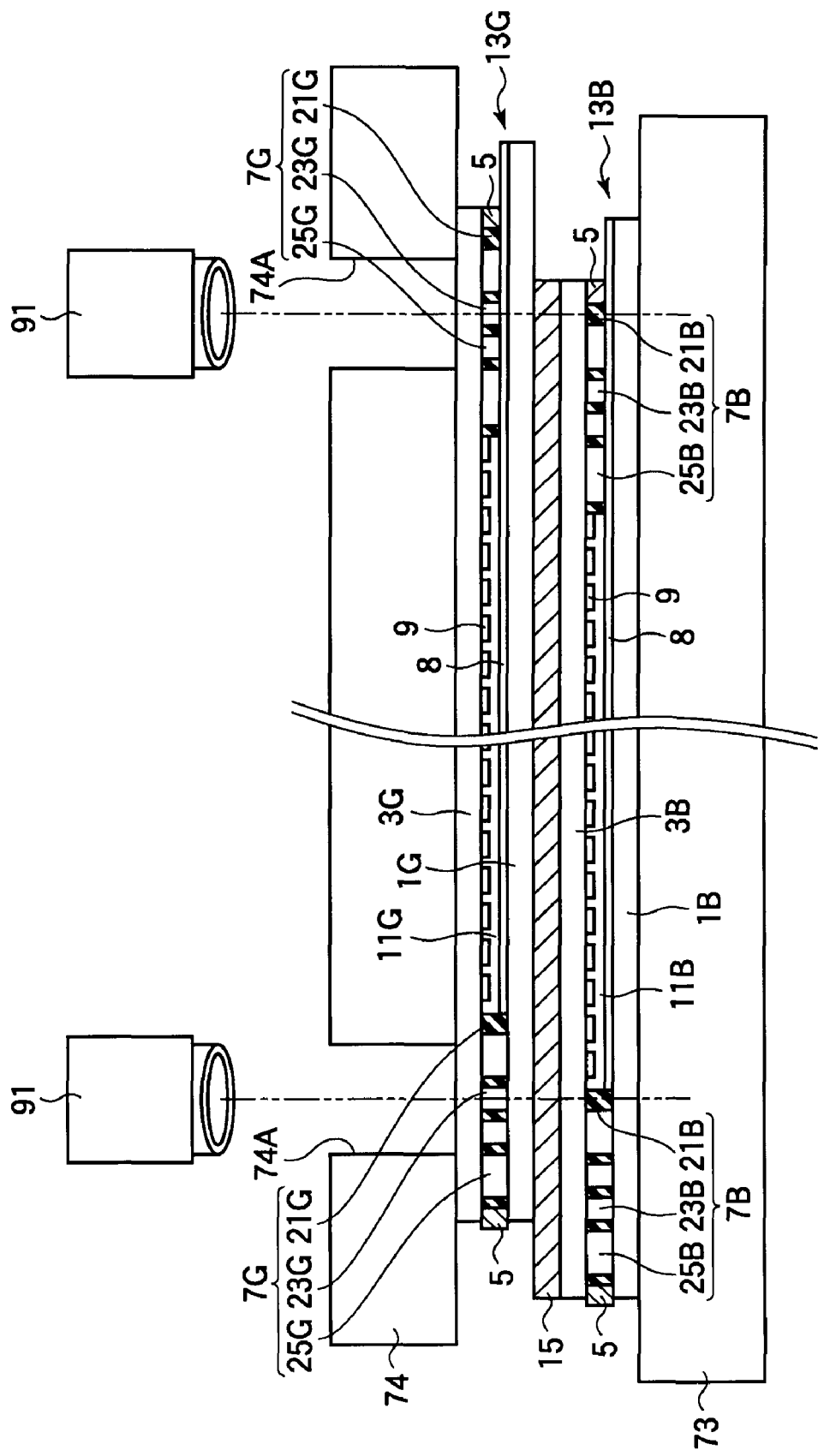
FIG. 5 is a cross section depicting the method of fabricating the multi-layer display element according to the first embodiment of the invention cut at line A-A shown in FIG. 4.

FIG. 5 is a cross section cut at line A-A shown in FIG. 4.

Subsequently, as shown in FIG. 5, the display panel 13G is laid on the display panel 13B such that the positions of the small alignment marks 21B and 21B are matched with the positions of the medium alignment marks 23G and 23G. At this time, an adhesive is spread between two display panels 13B and 13G to form the adhesive layer 15. Thus, the adhesive layer 15 made of this adhesive is formed between two facing surfaces of the glass substrates 3B and 1G. The adhesive is sometimes protruded around the display panels 13B and 13G.

Above the small alignment marks 21B and 21B of the display panel 13B and the small alignment marks 21G and 21G of the display panel 13G, CCD cameras 91 and 91 with an objective lens are arranged. The positions of the CCD cameras 91 and 91 are fixed, for example.

Subsequently, as schematically depicted by a dashed double-dotted line in the drawing, the small alignment mark 21B and the medium alignment mark 23G are visually recognized in the same visual field from the adsorption plate 74 side through the opening 74A with an image pickup system of the CCD camera 91.

Figure 6:
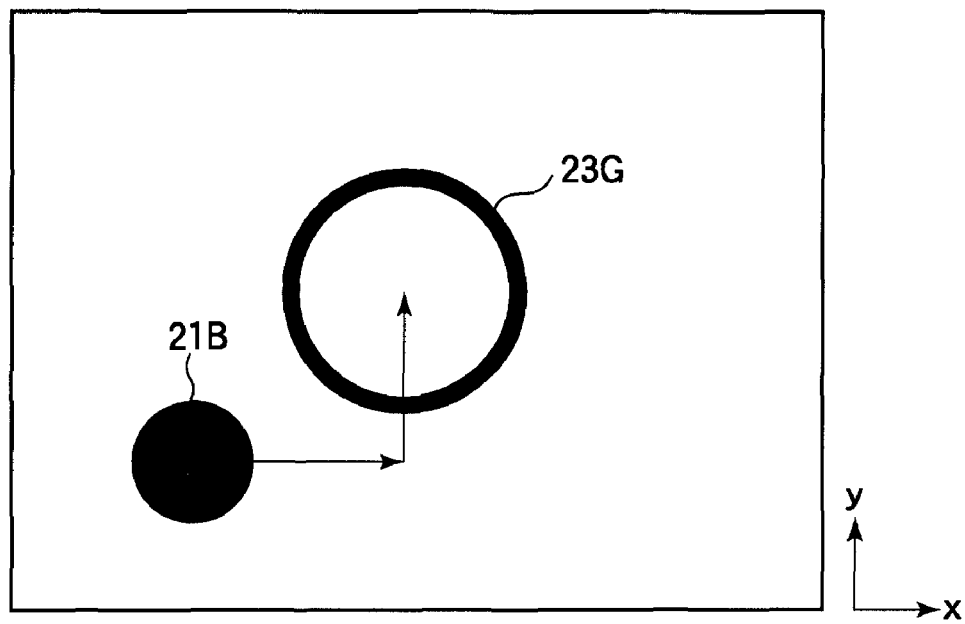
FIG. 6 is a schematic diagram depicting the method of fabricating the multi-layer display element according to the first embodiment of the invention, showing an image taken by a CCD camera.
Figure 7:
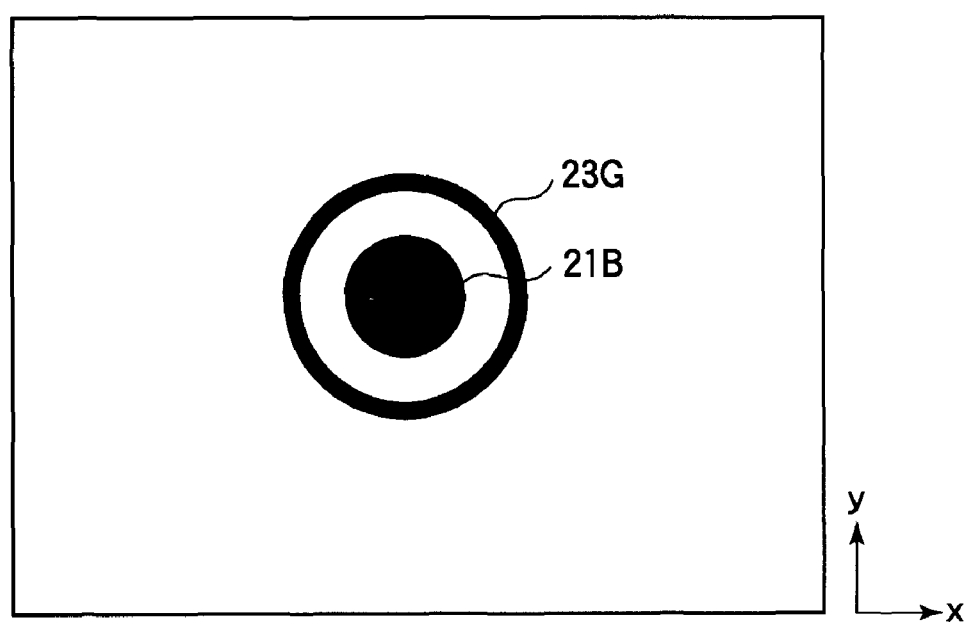
FIG. 7 is a schematic diagram depicting the method of fabricating the multi-layer display element according to the first embodiment of the invention, showing an image taken by the CCD camera after the adsorption plates are moved.

FIG. 6 is a schematic diagram depicting an image taken by the CCD camera 91. In addition, FIG. 7 is a schematic diagram depicting an image taken by the CCD camera 91 after the adsorption plate is moved.

In the embodiment, as shown in FIG. 6, by a method of image recognition, the x- and y-coordinates of the center of the small alignment mark 21B and the x- and y-coordinates of the center of the medium alignment mark 23G are recognized at the same time from the taken image, and an amount of displacement is measured in the x-y plane between the small alignment mark 21B and the medium alignment mark 23G.

Here, the display panels 13B and 13G to be adjacently placed in layers are aligned with each other with the small alignment mark 21B and the alignment mark 23G in different shapes, in which with respect to a circular shape alignment mark formed on one of the display panels, an alignment mark formed on the other display panel has a ring shape having the inner diameter greater than the diameter of the circular shape alignment mark formed on one of the display panels. Therefore, it is easy to distinguish between the alignment marks individually. In addition, because the alignment marks formed on the display panels placed in layers are provided at different positions in each layer, when focus is obtained on an alignment mark of one of the layers in simultaneous visual recognition, an alignment mark of the other layer is out of focus to sometime blur the edge of the alignment mark. However, the positions of the centers (barycenters) of the alignment marks are matched with each other, whereby it is difficult to cause a position shift because of blurred edges.

Subsequently, as schematically depicted by arrows shown in FIG. 6, one or both of the adsorption plate 73 and 74 (see FIG. 4) are moved in the X-direction and the Y-direction, and one or both of the display panels 13B and 13G are moved such that the amount of displacement between alignment marks 21B and 23G is made minimum. Thus, as shown in FIG. 7, the small alignment marks 21B and 21B can be aligned with the medium alignment marks 23G and 23G, which are provided two each on the display panels 13B and 13G. However, the expansion, contraction, or distortion of the glass substrates 1 and 3 (see FIG. 5), or the position shift of the alignment marks provided on the glass substrates 1 and 3 sometimes occurs to cause the deviation of relations between the positions of a plurality of alignment marks provided in the same display panel, and the plurality of these alignment marks might not be completely matched with a plurality of alignment marks provided in the display panel laid on. In this case, for example, when the small alignment marks 21B and 21B are aligned with the medium alignment marks 23G and 23G, which are provided two each, one or both of the display panels 13B and 13G are moved to the position for alignment, the position at which the amount of displacement between one of the small alignment marks 21B and one of the small alignment marks 23G is almost equal to the amount of displacement between the other small alignment mark 21B and the other small alignment mark 23G.

When each of the small alignment marks 21B and 21B is aligned with each of the medium alignment marks 23G and 23G as shown in FIG. 5, the adsorption plate 73 and 74 are removed from the display panels 13B and 13G. Subsequently, light is applied onto the adhesive layer 15 to cure the adhesive layer 15, and the display panel 13B is fixed to the display panel 13G by the adhesive layer 15.

Next, a process will be described in which the display panel 13R is aligned and placed in layers with the display panel 13B and the display panel 13G, which are fixed by the adhesive layer 15 and placed in layers.

Figure 8:
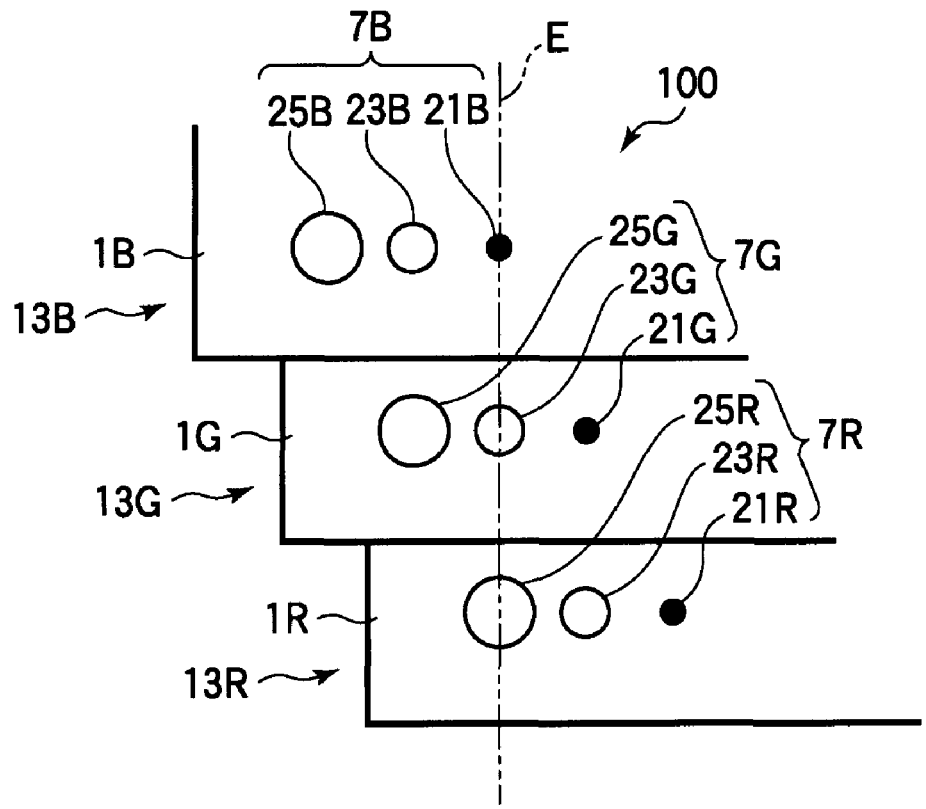
FIG. 8 is a schematic diagram depicting the method of fabricating the multi-layer display element according to the first embodiment of the invention, showing a process of aligning three display panels with one another.

FIG. 8 is a schematic diagram depicting a process of aligning three display panels 13B, 13G, and 13R with one another. In addition, for easy understanding, in FIG. 8, the display panels 13B and 13G aligned and placed in layers with the small alignment marks 21B and the medium alignment marks 23G are shown as these panels are displaced to each other.

First, the display panels 13B and 13G are adsorbed and fixed on the adsorption plate 73 as the display panel 13B is faced to the adsorption plate 73 side (see FIG. 5). Subsequently, a transparent liquid photo-curable adhesive is coated over a glass substrate 3G of the display panel 13G (see FIG. 3). Subsequently, the display panel 13R is adsorbed and fixed on the adsorption plate 74 as the glass substrate 3R is faced to the adsorption plate 74 side (see FIG. 5).

Figure 9:
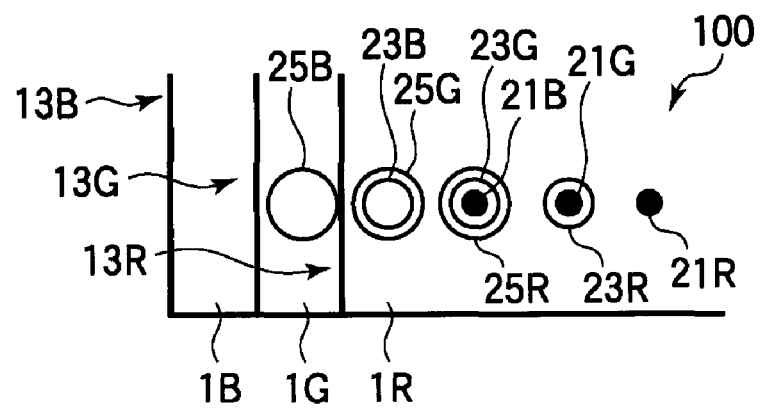
FIG. 9 is a plan view schematically depicting the method of fabricating the multi-layer display element according to the first embodiment of the invention, showing three display panels aligned with one another.

FIG. 9 is a plan view schematically depicting the three display panels 13B, 13G, and 13R aligned with one another.

When the display panel 13R is aligned with the display panel 13B and the display panel 13G placed in layers, this is conducted by the same process when the display panel 13B is aligned with the display panel 13G. When the display panel 13R is aligned with the display panel 13B and the display panel 13G placed in layers, as shown in FIG. 9, the small alignment marks 21B and 21B of the display panel 13B and the medium alignment marks 23G and 23G of the display panel 13G are aligned with the large alignment marks 25R and 25R of the display panel 13R. At this time, the medium alignment mark 23B of the display panel 13B is aligned with the large alignment mark 25G of the display panel 13G. In addition, the small alignment mark 21G of the display panel 13G is aligned with the medium alignment mark 23R of the display panel 13R.

The display panel 13R is aligned with the display panel 13B and the display panel 13G placed in layers, and then the adsorption plate 73 and 74 (see FIG. 4) are removed. Subsequently, light is applied to the adhesive layer 15 to cure the adhesive layer 15 (see FIG. 3), and the display panel 13G is fixed to the display panel 13R by the adhesive layer 15. By the process described above, the multi-layer display element 100 is completed.

Figure 10:
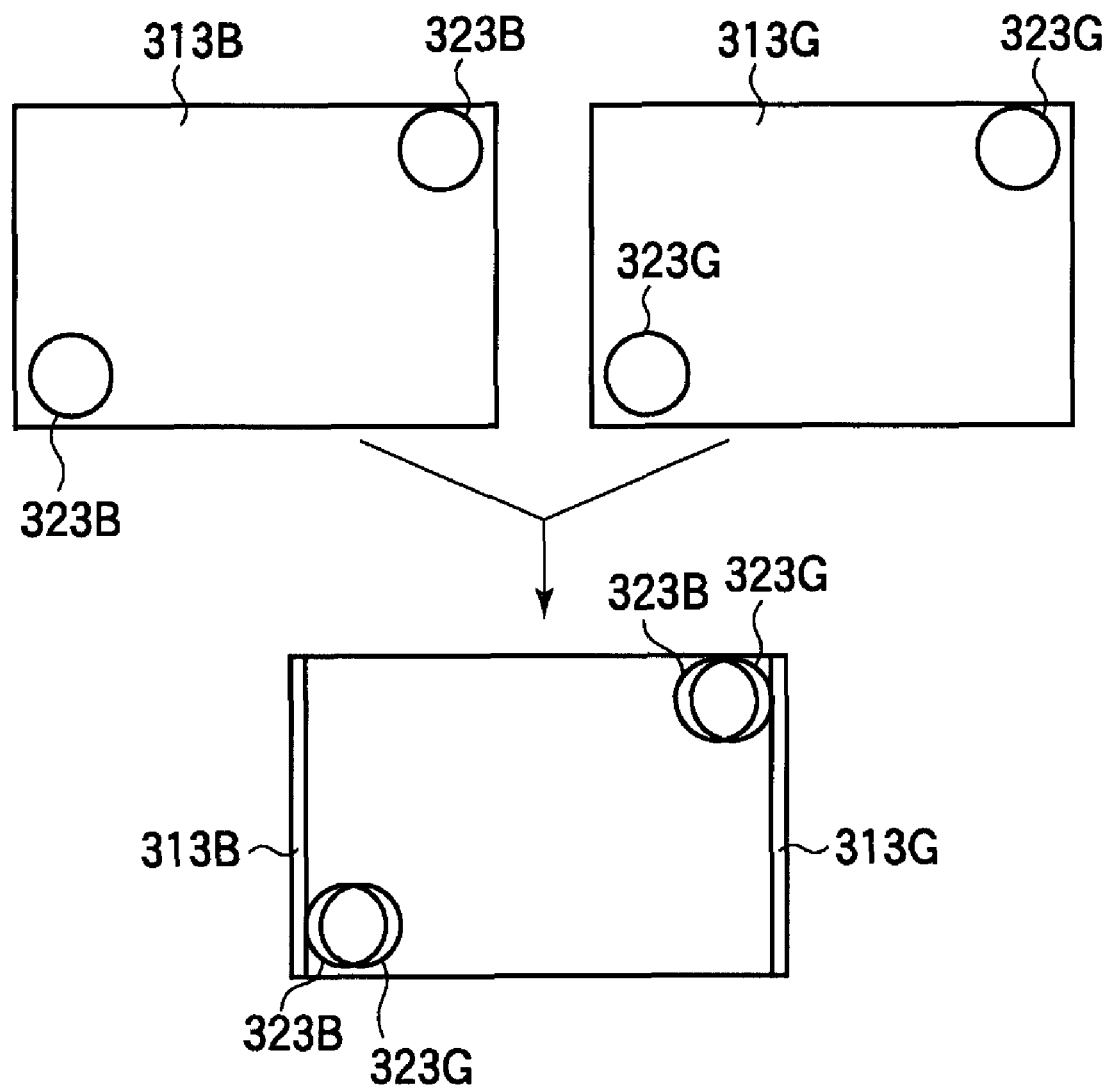
FIG. 10 is a diagram depicting a comparative example.
Figure 11:
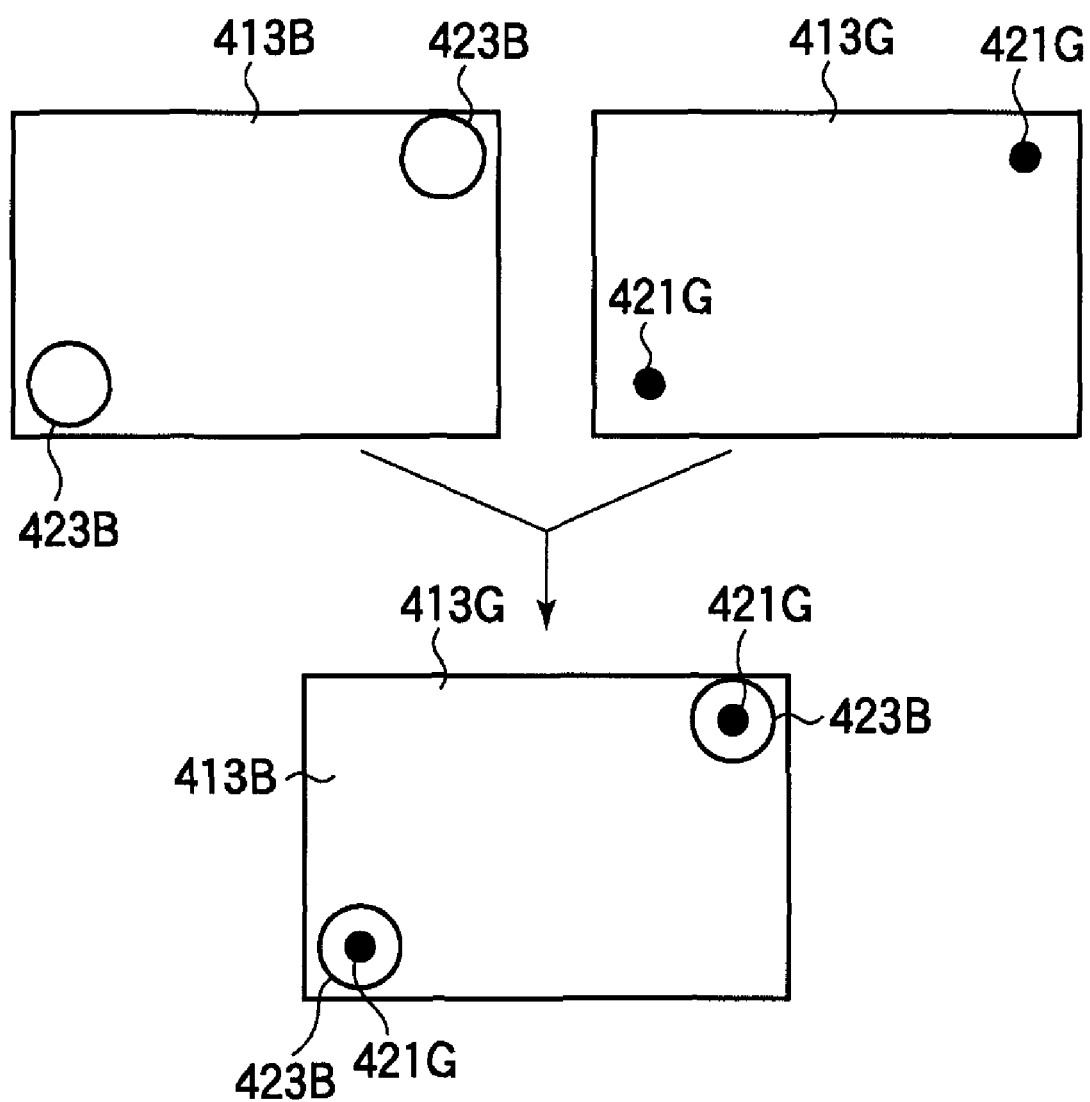
FIG. 11 is a diagram depicting another comparative example.
Figure 12:
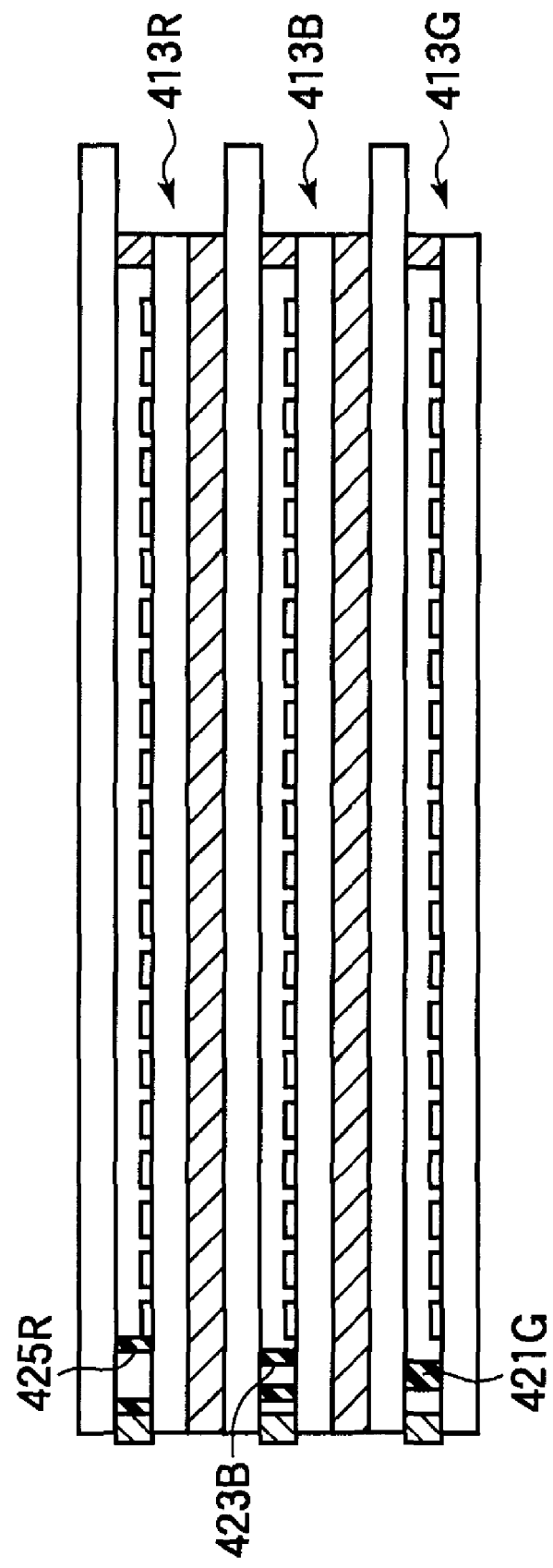
FIG. 12 is a cross section schematically depicting a multi-layer display element having display panels of another comparative example placed in three layers.
Figure 13:
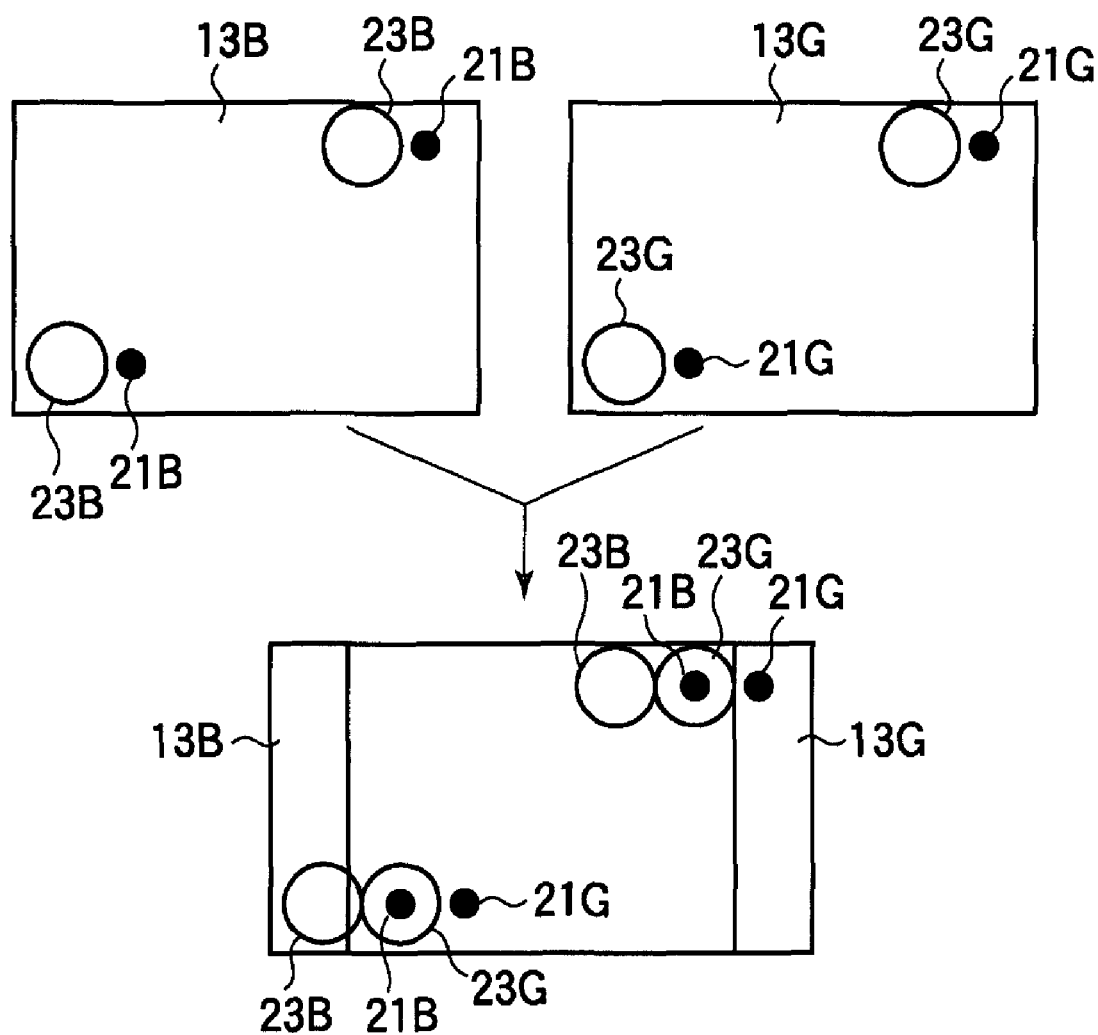
FIG. 13 is a plan view schematically depicting a display panel 13 according to the first embodiment of the invention.

FIG. 10 is a plan view schematically depicting an alignment process as a comparative example of aligning two display panels with each other in which an alignment mark is formed at the corners on each display panel in the same shape. FIG. 11 is a plan view schematically depicting an alignment process as another comparative example of aligning two display panels with each other in which alignment marks are formed in different shapes. FIG. 12 is a cross section schematically depicting a multi-layer display element having three layers of these display panels. In addition, FIG. 13 is a plan view schematically depicting the display panel 13 of the embodiment. In addition, in FIG. 13, only the small alignment marks 21B and 21G and the medium alignment marks 23B and 23G are shown.

When two display panels 313B and 313G having alignment marks 323B and 323G in the same shape formed at the corners, respectively, are aligned with each other, as shown in FIG. 10, it is difficult to know on which one of the upper and lower display panels 313B and 313G the alignment mark 323B or 323G is formed because the alignment marks 323B and 323G are laid on each other. On this account, it is difficult to know which one is which because distinction and determination are made in such a way that any one of the display panels 313B and 313G is slightly moved and the moved one of the alignment marks 323B and 323G corresponds to the display panel having been moved. Particularly, in aligning the display panels 313B and 313G with each other, a CCD cannot recognize the mark shape from a taken image, and it is difficult to align the display panels 313B and 313G with each other.

On the other hand, in aligning a display panel 413B having medium alignment marks 423B and 423B with a display panel 413G having small alignment marks 421G and 421G, the alignment marks 423B and 421G having different shapes, as shown in FIG. 11, the shape of the alignment mark is changed for each layer, and masks for forming the alignment marks are different. For example, as shown in FIG. 12, in the case of multi-layer display elements 413R, 413B, and 413G in the three layer structure for displaying red, blue, and green, because alignment marks 425R, 423B, and 421G formed in the display panels 413R, 413B, and 413G for displaying red, blue, and green, respectively, have different shapes, exposure masks for the alignment marks 425R, 423B, and 421G have to be changed for each of the display panels 413R, 413B, and 413G, which increases fabrication man-hours. On this account, in preparing the display panels 413R, 413B, and 413G, time and effort are required to separately prepare the display panels 413R, 413B, and 413G having different structures for individual layers to be placed in layers, leading to inefficiency and increases in fabrication costs.

In contrast to this, in the display panels 13B and 13G of the embodiment, as shown in FIG. 13, the display panels 13B and 13G are aligned with each other as the display panels 13B and 13G are displaced by the distance equal to the interval between the small alignment marks 21B and 21G and the medium alignment marks 23B and 23G. Thus, it is easy to know on which one of upper and lower display panels 13B and 13G the small alignment mark 21B and the medium alignment mark 23G are formed, which are aligned with each other, as well as the common display panel 13 can be used for each of the layers. Therefore, excellent efficiency and low fabrication costs are made possible.

The display panel 13 and the multi-layer display element 100 of the embodiment are provided with the pair of the substrates 1 and 3 faced to each other as the display material layer 11 is sandwiched between the substrates, a plurality of the pixels 2 provided in the plane almost in parallel with the substrate surface between the pair of the substrates 1 and 3, and the small alignment mark 21, the medium alignment mark 23, and the large alignment mark 25 formed in different shapes and linearly arranged in the directions of arrow C at the interval I1 or the interval I2 between the pair of the substrates 1 and 3 for alignment in placing panels in layers. Thus, when the display panels 13B, 13G, and 13R are laid on one another as they are displaced by the distance equal to the interval I1 or the interval I2, the center of the small alignment mark 21B formed in the display panel 13B is aligned with the center of the medium alignment mark 23G formed in the display panel 13G, and the center of the medium alignment mark 23G formed in the display panel 13G is aligned with the center of the large alignment mark 25R formed in the display panel 13R, whereby the alignment marks in different shapes are aligned with each other. Therefore, even though the common alignment mark group 7 is provided in each of the display panels 13B, 13G, and 13R, relations between the upper and lower positions of the display panels 13B, 13G, and 13R can be distinguished when the display panels 13B, 13G, and 13R are displaced and laid on one another, the alignment positions of the display panels 13B, 13G, and 13R can be readily aligned with one another, and working efficiency is improved. In addition, automatic alignment is also readily made possible in which image recognition is used for automatic alignment.

In addition, in the embodiment, a plurality of the display panels 13B, 13G, and 13R is placed in layers as the pixels 2 of the display panels 13B, 13G, and 13R are displaced in the directions of arrow C by the distance equal to the distance twice the pixel pitch P when the multi-layer display element 100 is provided. On this account, the pixels 2 are just laid on the upper and lower display panels 13 in each layer, and the arrangements of the pixels 2 of the display panels 13B, 13G, and 13R are aligned with one another. Therefore, high quality images can be displayed with no degraded display quality because of blurred text or images, or color shift caused by misaligned pixels in each layer.

Moreover, in the embodiment, because the alignment mark group 7 is formed to contact with two facing surfaces of the pair of the substrates 1 and 3, the contrast is high against the background, and visibility is excellent.

Moreover, in the embodiment, a plurality of the pixels 2 is provided in a dot matrix, allowing display in a given pattern. In the display panel 13 having a plurality of the pixels 2 provided in a dot matrix, a large number of the pixels 2 in the same structure are arranged, and it is difficult to know the occurrence of misalignment that the positions of the display panels 13 placed in layers are shifted to the positions not intended when the alignment mark group 7 is not provided. Therefore, it is significantly effective to provide the alignment mark group 7.

In addition, in the embodiment, because the alignment mark group 7 is provided thick between the glass substrates 1 and 3 of the display panel 13 faced to each other at the same height as the distance between two facing surfaces in the direction vertical to the display surface, visibility is excellent.

Second Embodiment

A multi-layer display element according to a second embodiment of the invention will be described with reference to FIGS. 14 to 16.

A multi-layer display element 200 of the embodiment has almost the same configuration as that of the multi-layer display element 100 of the first embodiment, and it is different in the material of a substrate to form display panels and the layered state of the display panels. Hereinafter, common components are designated the same numerals and signs, and the descriptions are omitted.

Figure 14:
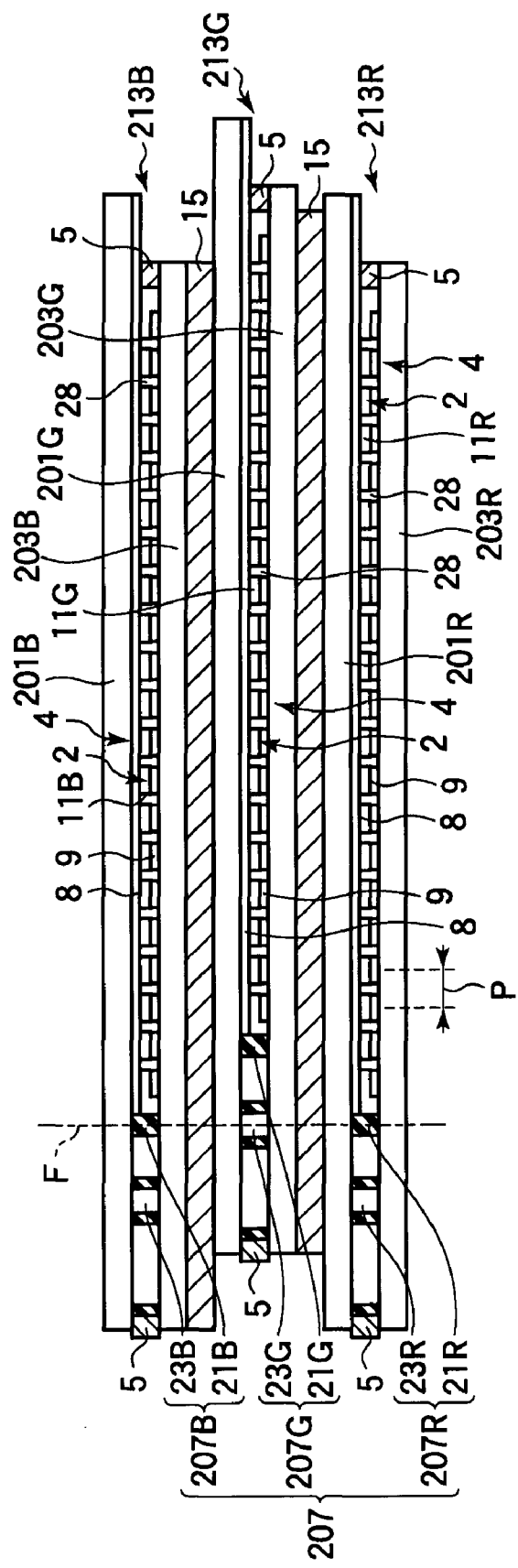
FIG. 14 is a cross section depicting a multi-layer display element according to a second embodiment of the invention.

FIG. 14 is a cross section depicting the multi-layer display element of the second embodiment.

Display panels 213B, 213G, and 213R of the embodiment each have a pair of rectangular resin substrates 201 and 203.

In the substrates 201 and 203 using resin, it is difficult to maintain the interval between the resin substrate 201 and the resin substrate 203 almost constantly. Thus, a spacer 28 in a rib structure (a partition structure) is formed between pixels 2 adjacent to each other for holding the interval between the pair of the substrates 201 and 203 in an almost constant distance as the spacer 28 contacts with the resin substrate 201 and the resin substrate 203. The spacer 28 is formed in the rib structure such that a resist is coated over any one of the resin substrates 201 and 203 provided with transparent electrode lines 8 and 9 in stripes and is patterned in a grid by photolithography. In the embodiment, in conducting the photolithographic process of forming the spacer 28, an alignment mark group 207 is formed on the outer edges of the resin substrates 201 and 203 provided with the spacers 28 in the same layer with the same material for forming spacer 28 at the same time. In addition, the shape of the spacer 28 is not limited to the rib structure, and the spacer 28 may be formed in a cylindrical shape at the center of four pixels 2 adjacent to each other.

In the display panels 213B, 213G, and 213R, alignment mark groups 207B, 207G, and 207R are formed, respectively. The alignment mark groups 207B, 207G, and 207R have small alignment marks 21B, 21G, and 21R, respectively, and the medium alignment marks 23B, 23G, and 21R, respectively.

Figure 15:
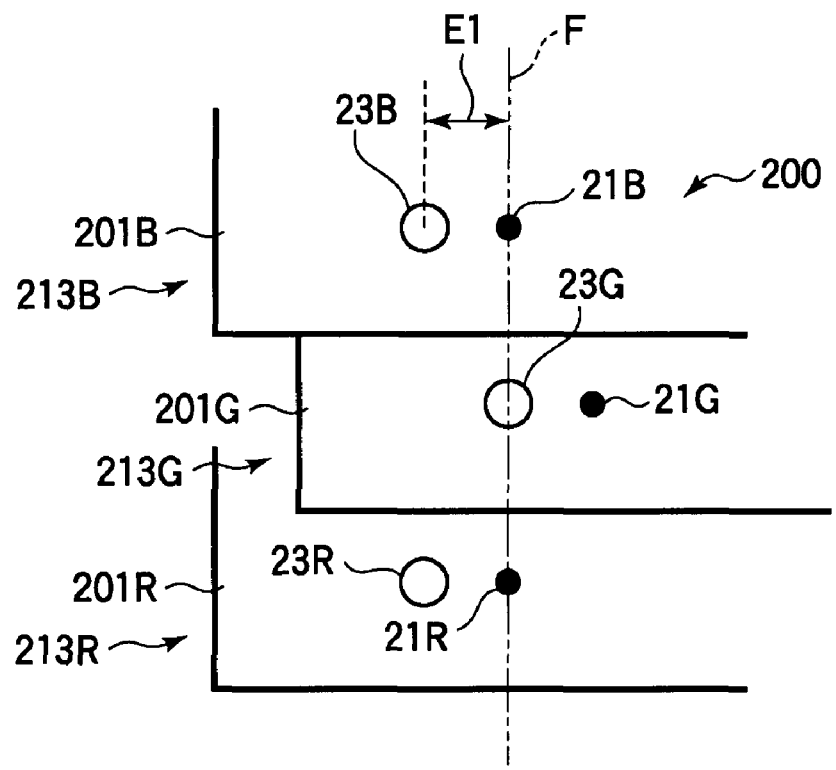
FIG. 15 is a schematic diagram depicting a method of fabricating a multi-layer display element according to the second embodiment of the invention, showing a process of aligning three display panels with one another.

FIG. 15 is a schematic diagram depicting a process of aligning three display panels 213B, 213G, and 213R with one another.

As shown in FIG. 15, the display panel 213B and the display panel 213G are placed in layers such that the center of the medium alignment mark 23G formed in the display panel 213G is aligned with the center of the small alignment mark 21B formed in the display panel 213B.

In addition, the display panel 213G and the display panel 213R are placed in layers such that the center of the small alignment mark 21R formed in the display panel 213R is aligned with the center of the medium alignment mark 23G formed in the display panel 13G.

Thus, the centers of the small alignment mark 21B of the display panel 213B, the medium alignment mark 23G of the display panel 213G, and the small alignment mark 21R of the display panel 213R are aligned with one another on a straight line depicted by dashed double-dotted line F. Thus, the display panel 213B and the display panel 213G adjacently placed in layers are layered such that they are displaced by an interval I1, that is, the distance equal to the distance twice a pixel pitch P (see FIG. 14) in the directions of arrow C. In addition, similarly, the display panel 213G and the display panel 213R adjacently placed in layers are laid on each other such that they are displaced by the distance equal to the distance of the interval I1 in the directions of arrow C in the direction opposite to the direction of displacing the display panel 213B and the display panel 213G.

Subsequently, the alignment process and a bonding process of the display panels 213B, 213G, and 213R will be described.

Figure 16:
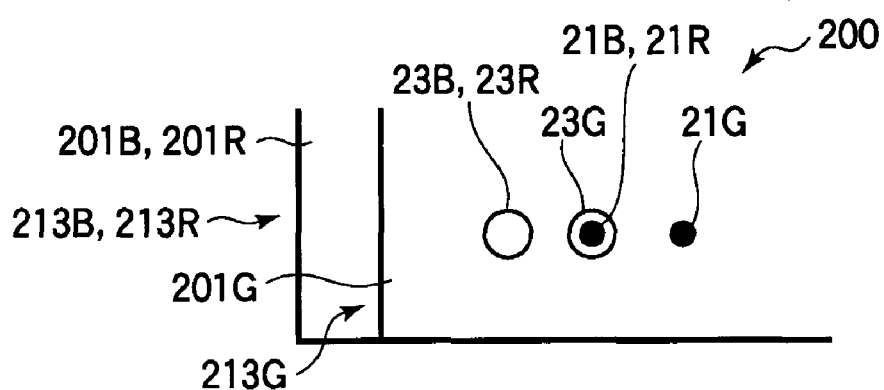
FIG. 16 is a plan view schematically depicting the method of fabricating the multi-layer display element according to the second embodiment of the invention, showing three display panels aligned with one another.
Figure 17:
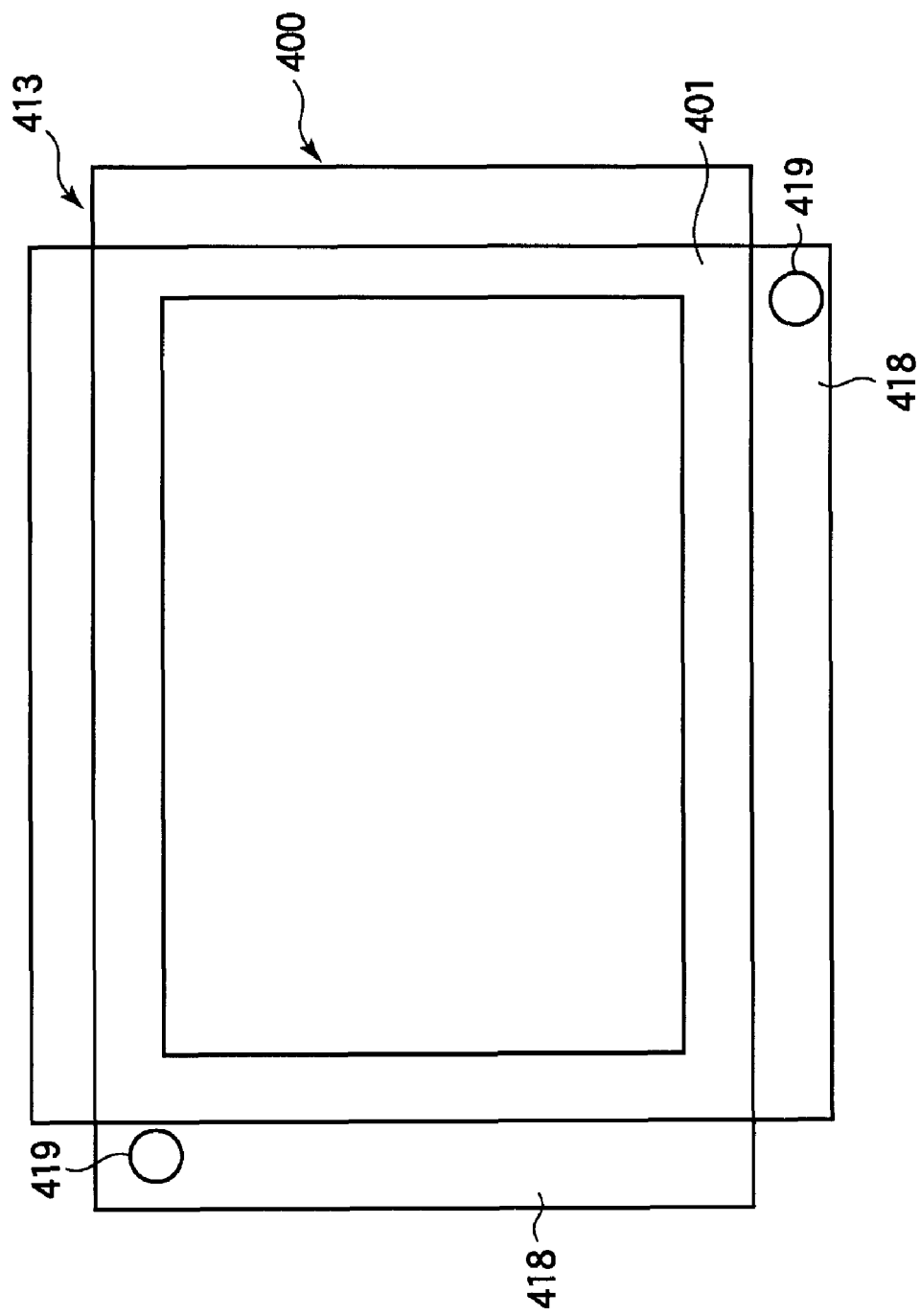
FIG. 17 is a plan view schematically depicting a previous liquid crystal display element disclosed in Patent Document 1.
Figure 18:
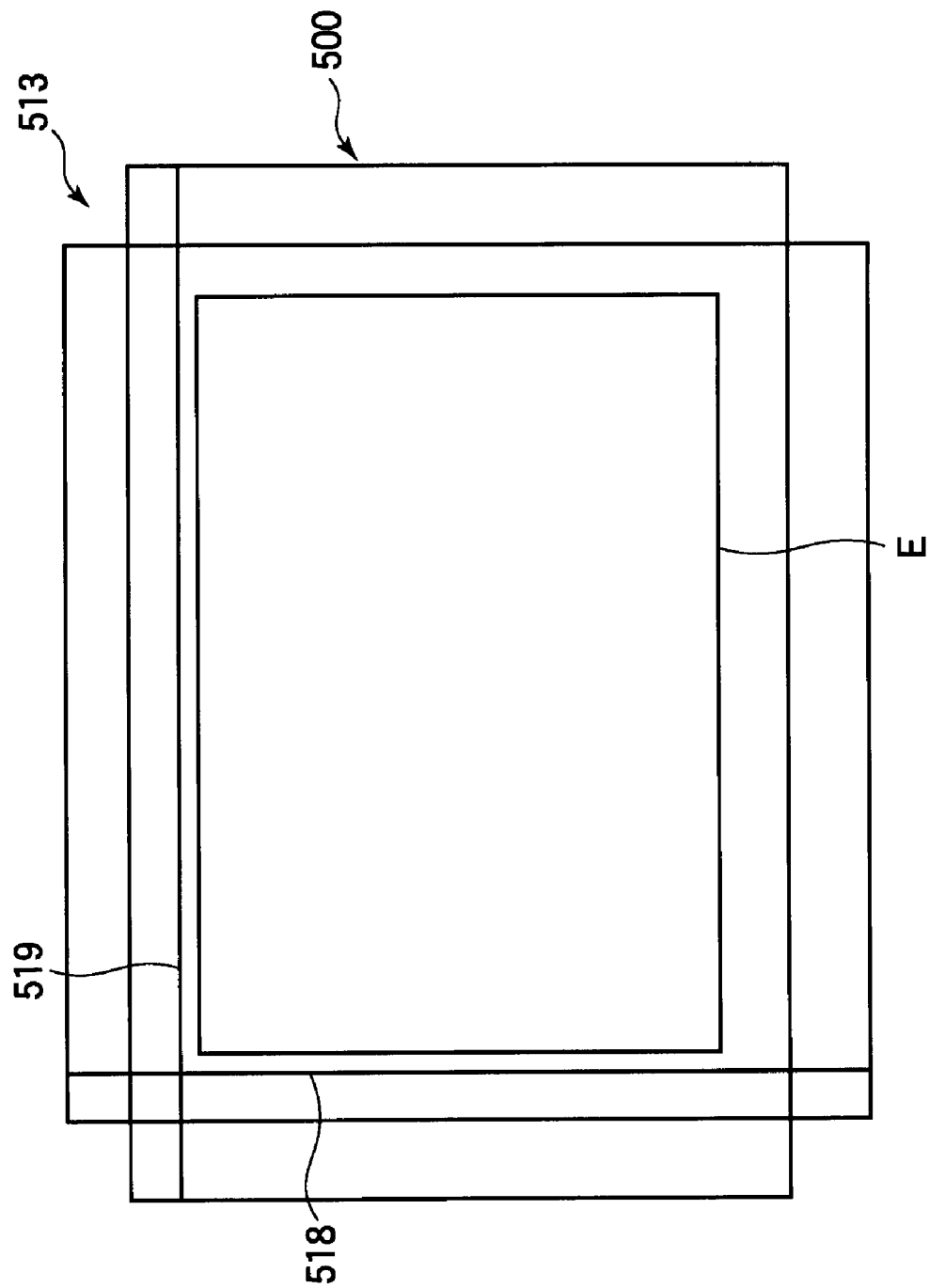
FIG. 18 is a plan view schematically depicting a previous liquid crystal display element disclosed in Patent Document 3.

FIG. 16 is a plan view schematically depicting three display panels 213B, 213G, and 213R aligned with one another.

In the embodiment, the display panel 213B and the display panel 213G are aligned as similar to the manner in the first embodiment.

When the display panel 213R is aligned and laid on the display panels 213B and the display panel 213G, which are fixed and placed in layers by an adhesive layer 15, as shown in FIG. 16, the small alignment mark 21R of the display panel 213R is aligned with the small alignment mark 21B of the display panel 213B and the medium alignment mark 23G of the display panel 213G. At this time, the small alignment mark 21R of the display panel 213R and the small alignment mark 21B of the display panel 213B have the same shape. However, the small alignment mark 21B is already aligned together with the medium alignment mark 23G of the display panel 213G, that is, the small alignment mark 21R has a different shape from the shape of the alignment mark formed of the small alignment mark 21B and the medium alignment mark 23G.

The multi-layer display element 200 of the embodiment is provided with the pair of the substrates 201 and 203 faced to each other as a display material layer 11 is sandwiched between the substrates, a plurality of the pixels 2 provided in the plane almost in parallel with the substrate surface between the pair of the substrates 201 and 203, and the small alignment marks 21B, 21G, and 21R and the medium alignment marks 23B, 23G, and 23R formed in different shapes and linearly arranged in the directions of arrow C at the interval I1 between the pair of the substrates 201 and 203 for alignment in placing panels in layers. Thus, when the display panels 213B, 213G, and 213R are laid on one another as they are displaced by the distance equal to the interval I1, the center of the small alignment mark 21B formed in the display panel 213B is aligned with the center of the medium alignment mark 23G formed in the display panel 213G, and the center of the medium alignment mark 23G formed in the display panel 213G is aligned with the center of the small alignment mark 21R formed in the display panel 13R, whereby the alignment marks in different shapes are aligned with one another. Therefore, even though the common alignment mark groups 207B, 207G, and 207R are provided in the display panels 213B, 213G, and 213R, relations between the upper and lower positions of the display panels 213B, 213G, and 213R can be distinguished when the display panels 213B, 213G, and 213R are displaced and laid on one another, the alignment positions of the display panels 213B, 213G, and 213R can be readily aligned with one another, and working efficiency is improved. In addition, automatic alignment is also readily made possible in which image recognition is used for automatic alignment.

In addition, in the multi-layer display element 200 of the embodiment, the pixels 2 of the display panels 213B, 213G, and 213R are displaced in the directions of arrow C by the distance equal to the distance twice the pixel pitch P. Thus, the pixels 2 are just laid on the upper and lower display panels 213 in each layer, and the arrangements of the pixels 2 of the display panels 213B, 213G, and 213R are aligned with one another. Therefore, high quality images can be displayed with no degraded display quality because of blurred text or images, or color shift caused by misaligned pixels in each layer.

Moreover, in the embodiment, because the alignment mark group 207 is formed to contact with two facing surfaces of the pair of the substrates 201 and 203, the contrast is high against the background, and visibility is excellent.

Moreover, in the embodiment, a plurality of the pixels 2 is provided in a dot matrix, allowing display in a given pattern. In the display panel 213 having a plurality of the pixels 2 provided in a dot matrix, a large number of the pixels 2 in the same structure are arranged, and it is difficult to know the occurrence of misalignment that the positions of the display panels 213 placed in layers are shifted to the positions not intended when the alignment mark group 207 is not provided. Therefore, it is significantly effective to provide the alignment mark group 207.

In addition, in the embodiment, in forming the spacer 28 for providing space between the resin substrate 201 and the resin substrate 203, the alignment mark group 207 is formed by changing mask patterns, whereby the alignment mark group 207 can be readily formed with no increases in fabrication man-hours.

As discussed above, the invention has been described based on the embodiments. The invention is not limited to the embodiments above, which can be variously modified.

For example, in the first embodiment, the alignment mark group 7 formed of three alignment marks is provided, and in the second embodiment, the alignment mark group 207 formed of two alignment marks is provided. However, the invention is not limited to these embodiments. The alignment mark may be formed by other numbers as long as alignment marks are formed in different shapes. At this time, preferably, the alignment mark group is provided near the diagonally opposite corners of the display panel, or near the end parts of opposite sides, in order to prolong the interval between two alignment mark groups for improved alignment accuracy.

In addition, in the embodiments, the alignment mark groups 7 and 207 are provided inside the sealing wall 5 and outside the pixel area 4 where the display area is formed. However, the invention is not limited to these embodiments. The alignment mark group can be provided at a given location inside the plane of the display panel. For example, when the alignment mark is formed small enough such that display quality is not impaired, the alignment mark may be provided inside the display area.

Moreover, in the embodiments, the alignment mark groups 7 and 207 are formed by photolithography. However, the invention is not limited to these embodiments. The alignment mark may be formed by using a dispenser or various printings such as silk screen, letterpress, intaglio printing, or planography. In addition, in patterning the transparent electrode lines 8 and 9 on the glass substrates 1 and 3, patterns may be formed to include the alignment mark group 7, although visibility is not so excellent.

In addition, in the embodiment, the alignment mark group 7 is formed thick between the glass substrates 1 and 3 of the display panel 13 faced to each other in the direction vertical to the display surface at the same height as the distance between two facing surfaces. However, the invention is not limited to this embodiment, and the thickness of the alignment mark is not limited to the height equal to the distance between two facing surfaces of the substrate. In forming the alignment mark group 7 at the same height as the distance between two facing surfaces, when the thickness of the alignment mark is too thin, the contrast to the area around the alignment mark is reduced as well as the thickness of the display body between the electrodes becomes thin. Thus, for example, in the liquid crystal display element, the display contrast might be reduced. In addition, when the thickness of the alignment mark is too thick, the edge of the alignment mark is blurred to cause the degraded accuracy of positions as well as high voltage is required in driving liquid crystals. Therefore, a thicker alignment mark is not preferable. Thus, preferably, the thickness of the alignment mark is one to ten micrometers. Moreover, because the contrast of the alignment mark against the background becomes high, an alignment mark in micro size can be formed inside the display area. Therefore, the alignment mark can be provided even though there is enough space in the edge, and a so-called narrow frame display panel can be prepared.

Moreover, in the embodiments, descriptions are made based on the display panels 13 and 213 using liquid crystals as a display material. However, the invention is not limited to these embodiments. Such a multi-layer display element is sufficient that a display panel does not fully block light and another display panel on the under side can be visually recognized through the display panel above. For display materials usable in such multi-layer display elements, such display elements may be sufficient, which use electrochemical types such as electrochromic displays or electrodeposition displays in which an electrolyte causes chemical reactions by application of voltage for producing and erasing color.

Moreover, in the embodiments, such a method is used in which the adhesive layer 15 is formed of a transparent photocurable adhesive cured by irradiation of light to bond the display panels 13 or 213 to each other. However, the invention is not limited to these embodiments. There are other methods, such as a method of using a thermosetting adhesive cured by heat, a method in which a sheet-like adhesive is sandwiched between two display panels to bond the panels and the sheet-like adhesive is then cured by light or heat, and a method in which a pressure sensitive adhesive double coated sheet is sandwiched between two display panels and the panels are bonded by a roller or pressure. The alignment process and the bonding process of display panels by these methods may be conducted under atmospheric pressure, or under a reduced pressure. Although the case of conducting the processes under a reduced pressure needs large scale facilities, this case is advantageous in that bubbles hardly remain in the adhesive layer.

Because the alignment positions of the display panels can be readily aligned with each other even though common alignment marks are provided on each of the display panels, the invention can be applied to various multi-layer display elements.

What is claimed is:

1. A display panel comprising:
a pair of substrates faced to each other as a display material layer is sandwiched therebetween;
a plurality of pixels provided in a plane parallel with a substrate surface between the substrates; and
a plurality of alignment marks formed in different shapes and linearly arranged on at least one of the pair of the substrates at a predetermined interval for alignment in placing the display panel and an other display panel having the same alignment mark structure as the display panel in layers.

2. The display panel according to claim 1, wherein the plurality of the alignment marks are arranged in parallel with a direction of extending an electrode to drive the plurality of the pixels.

3. The display panel according to claim 1, wherein the predetermined interval is equal to a distance of an integral multiple of a pixel pitch.

4. The display panel according to claim 1, wherein the alignment marks are formed to contact with two facing surfaces of the pair of the substrates.

5. The display panel according to claim 4, comprising a spacer configured to contact with the two facing surfaces for holding an interval between the pair of the substrates, wherein the alignment marks are formed of the same material as a material of forming the spacer in the same layer.

6. The display panel according to claim 1, wherein the plurality of the pixels are provided in a dot matrix.

7. The display panel according to claim 1, wherein the display material layer has liquid crystals forming a cholesteric phase.

8. A multi-layer display element comprising a plurality of display panels placed in layers,
wherein the display panel is the display panel according to claim 1.

9. The multi-layer display element according to claim 8, wherein the display panel has a pixel area formed of the plurality of the pixels, and
pixel areas of the display panels adjacently placed in layers are displaced in a direction of arranging the alignment marks.

10. A method of fabricating a multi-layer display element, the method comprising the steps of:
preparing a plurality of display panels, each including a pair of substrates faced to each other as a display material layer is sandwiched therebetween, a plurality of pixels provided along a display surface of the substrates, and a plurality of alignment marks formed in different shapes and linearly arranged on at least one of the pair of the substrates at a predetermined interval for alignment in placing the display panels in layers, wherein the plurality of the display panels have the same alignment mark structures;
laying the plurality of the display panels on each other;
aligning the alignment marks in different shapes formed in the adjacent display panels with each other; and
bonding the plurality of the display panels together.

11. The method according to claim 10, wherein the plurality of the alignment marks are formed so as to be arranged in parallel with a direction of extending an electrode to drive the plurality of the pixels.

12. The method according to claim 10, wherein the predetermined interval is equal to a distance of an integral multiple of a pixel pitch.

13. The method according to claim 10, wherein the alignment marks are formed to contact with two facing surfaces of the pair of the substrates.

14. The method according to claim 13, wherein the alignment marks are formed of the same material as a material of forming a spacer at the same time in the same layer, the spacer configured to contact with the two facing surfaces for holding an interval between the pair of the substrates.

15. The method according to claim 10, wherein the plurality of the pixels are provided in a dot matrix.

16. The method according to claim 10, wherein liquid crystals for forming a cholesteric phase are used for the display material layer.

17. The method according to claim 16, wherein the display panels are placed in layers such that pixel areas formed of the plurality of the pixels are displaced in a direction of arranging the alignment marks.

18. The method according to claim 10, wherein the alignment marks formed in each of the display panels are visually recognized in the same visual field, and
the display panel is moved to align the alignment marks with each other.

* * * * *